(12) United States Patent
Isu et al.

(10) Patent No.: US 6,301,301 B1
(45) Date of Patent: Oct. 9, 2001

(54) APPARATUS AND METHOD FOR CODING AND DECODING A MOVING IMAGE

(75) Inventors: Yoshimi Isu; Shunichi Sekiguchi; Kohtaro Asai, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/014,917

(22) Filed: Jan. 28, 1998

(30) Foreign Application Priority Data

Aug. 5, 1997 (JP) .................................................. 9-210278

(51) Int. Cl.⁷ ...................................................... H04N 7/12
(52) U.S. Cl. .............................. 375/240.14; 375/240.12; 375/240.13
(58) Field of Search ..................................... 348/394, 402, 348/407, 413, 415, 416, 699, 700, 394.1, 402.1, 407.1, 413.1, 415.1, 416.1, 409.1, 411.1; 382/243, 242, 239, 236; 375/240.12, 240.13, 240.14, 240.15, 240.16, 240.24, 240.08; 386/111

(56) References Cited

U.S. PATENT DOCUMENTS

| | | | |
|---|---|---|---|
| 5,150,432 | * 9/1992 | Ueno et al. | 382/250 |
| 5,295,201 | * 3/1994 | Yokohama | 382/236 |
| 5,534,927 | * 7/1996 | Shishikui et al. | 348/400 |
| 5,815,601 | * 9/1998 | Katata et al. | 382/232 |
| 5,883,976 | * 3/1999 | Ohsawa | 382/232 |
| 5,929,912 | * 7/1999 | Aono et al. | 348/398 |
| 5,949,956 | * 9/1999 | Fukuda | 386/112 |
| 5,963,673 | * 10/1999 | Kodama et al. | 382/239 |
| 5,978,515 | * 11/1999 | Katata et al. | 382/243 |
| 5,991,453 | * 11/1999 | Kweon et al. | 382/250 |
| 5,999,219 | * 12/1999 | Boon | 348/409 |

OTHER PUBLICATIONS

ITU–T Telecommunication Standarization Sector of ITU Draft H. 263 (Dec. 5, 1995) pp. 1–28.
Luis Corte–Real, IEEE Transactions on Image Processing vol., 5, No., 3, Feb. 1996, pp. 263–273.

* cited by examiner

Primary Examiner—Vu Le

(57) ABSTRACT

In order to reduce the amount of coded data to be generated without deteriorating the visually significant image quality of the image area, the input image signal 1 is first input to the area divider 2. Then, the input image signal 1 is divided into a plurality of areas in accordance with the initial area shape retrieved from the external memory. The initial area shape is the area shape of the frame immediately previous to the current frame. The area divider 2 subdivides the areas based on the activity of each area, and integrates areas so as to reduce the coding cost between one area and its adjacent area. Information, such as the area shape information 3 which is determined by the area divider, is coded by the encoder 7 and converted into the bit stream 11. The encoder 7 outputs the local decoded image 8 which is written in the external memory 9. The local decoded image 8 is used as the reference image 10 during the area dividing and the coding processes. The area shape information 3 is also written in the external memory 9. The area shape information 3 is used during the area dividing process.

36 Claims, 22 Drawing Sheets

APPARATUS AND METHOD FOR CODING AND DECODING A MOVING IMAGE

BACKGROUND OF THE INVENTION

1. Field of the Invention

The present invention generally relates to a coding technique for a moving image, and more particularly to a predictive coding technique for coding images by predicting a motion of an object.

2. Description of the Prior Art

FIG. 23 shows a structure of an moving image coding apparatus according to a first conventional technique, which is constructed based on the recommendation H.263 by ITU-T. In the figure, a reference numeral 1 is an input image, 101 is a differentiator, 102 is a prediction signal, 103 is a prediction error signal, 104 is an encoder, 105 is coded data, 106 is a decoder, 107 is a decoded prediction error signal, 108 is an adder, 109 is a local decoded image signal, 110 is a memory, 111 is a predictor, and 112 is a motion vector.

The input image 1 to be coded is input to the differentiator 101. The differentiator 101 determines a difference between the input image 1 and the prediction signal 102 which will be described later, and outputs the difference as the prediction error signal 103. The encoder 104 codes the input image 1 or the prediction error signal 103 and outputs the coded data 105. The encoder 104 uses DCT (Discrete Cosine Transformation), which is one type of quadrature conversions, to convert the prediction error signal 103 from a space domain to a frequency domain, and linearly quantize conversion coefficients obtained by DCT The coded data 105 obtained by the encoder 104 is then divided into two parts. One part is transmitted to a decoder on the receiver side (not shown), while the other is input to the decoder 106 provided in this apparatus. The decoder 106 operates in a reverse way to the encoder 104, and determines and outputs the decoded prediction error signal 107 from the coded data. The adder 108 adds the decoded prediction error signal 107 to the prediction signal 102, to thereby determine and output the decoded image signal 109. The predictor 111 carries out motion compensative prediction using the input image 1 to be coded and the decoded image signal 109 of the frame located immediately previous to the current frame stored in the memory 110, and outputs the prediction signal 102 and the motion vector 112. Motion compensation is carried out by blocks of a fixed size. Each block is called a macro block consisting of 16×16 pixels. For those blocks located at heavy movement part of the image, an optional function is provided to carry out the motion compensative prediction by sub-blocks, each consisting of 8×8 pixels, formed by quartering one macro block. The thus obtained motion vector 112 is transmitted to a decoder on the receiver side (not shown), while the prediction signal 102 is sent to the differentiator 101 and the adder 108.

FIG. 24 shows a structure of a moving image coding apparatus according to a second conventional technique. The apparatus is constructed based on the coding system proposed in "A Very Low Bit Rate Video Coder Based on Vector Quantization", IEEE Trans. on Image Processing, Vol. 5, No. 2, February, 1996. In the figure, a reference numeral 113 is an area divider, 114 is a predictor, 115 is an area determinator, 116 is coding mode information, 117 is a motion vector, 118 is an encoder, and 119 is coded data.

As shown in FIG. 24, the system divides the input image 1 into a plurality of areas by the area divider 113. The area divider 113 determines the area shape in accordance with a motion compensative prediction error. Specifically, among predetermined 10 block sizes, i.e., 4×4, 4×8, 8×4, 8×8, 8×16, 16×8, 16×16, 16×32, 32×16, and 32×32, the area divider 113 assigns smaller blocks to the areas including heavy movement, while assigning larger blocks to the areas including light movement, such as a background, by judging a distribution of inter-frame signals using a threshold value. More specifically, the area determinator 115 calculates a variance of the prediction error signal obtained by the predictor 114 and determines each block size based on the variance. Attribute information 116, such as the area shape or the coding mode of each area, and the motion vector 117 are also determined at this stage. In accordance with the coding mode information included in the attribute information 116, the encoder 118 codes the prediction error signal or the original signal to obtain the coded data 119. The succeeding procedures are the same as the first conventional technique described above.

The first conventional technique restricts the area shape used as a coding unit to only two types which are both square. As a result, coding is carried out regardless of whether the area is located at little movement part, such as a background, or at heavy movement part, such as edge parts of an object. Thus, this technique is not capable of accomplishing the adaptive coding which dynamically corresponds to the scene configuration.

The second conventional technique provides square blocks of multiple sizes, so that low significance areas are coded coarsely by larger blocks and the high significance areas are coded finely by smaller blocks. Thus, coding can be carried out in accordance with the scene configuration of the image. However, as the area shape is limited to square blocks, this technique has to be improved to realize the adaptive coding corresponding to a desired area shape.

In addition, if coding is carried out for individual areas which are determined by the area division corresponding to a desired area shape, both the amount of calculations involved in the area division and the amount of codes required for the area shape will be increased.

SUMMARY OF THE INVENTION

The present invention is made to solve the above-mentioned problems. An object of the present invention is to provide a coding technique for a moving image by using an area dividing technique capable of precisely corresponding to various image configurations. More specifically, the present invention aims to attain an adaptive coding which better corresponds to the scene configuration of the image, while reducing the amount of calculations related to the area division as well as the amount of codes related to the coding mode, by selecting a suitable area dividing method or coding method in response to the contents of an image or individual areas. Another object of the present invention is to provide a decoding technique capable of precisely decoding the coded data of areas which have been divided into various shapes.

In one aspect of the present invention, a moving image coding apparatus which divides an input digital image into a plurality of areas with a predetermined method comprises: a memory which stores information representing the shape of the areas; a projector which reads from the memory the area shape of a previously coded image, and projects the area shape onto an image to be coded to obtain an initial area shape; a divider which further divides each area of the input image into smaller areas in accordance with a predetermined judging method, the initial area shape of the input image being determined by the projector; an integrator which integrates the areas divided by the divider while determining whether or not each area is integrated with an adjacent area in accordance with the predetermined judging method; and an encoder which codes information from each area, the information including the image signals, motion information, shape information, and other attribute information.

The divider of the moving image coding apparatus includes: an activity calculator which calculates an activity for each area determined by the projector; a comparator which compares the activity with a predetermined reference value; and a subdivider which divides a particular area having the activity greater than the reference value into smaller areas in accordance with the comparison result obtained by the comparator.

Also, the divider of the moving image coding apparatus includes: an activity calculator which calculates an activity for each block of a fixed size regardless of the shape information; a comparator which compares the activity with a predetermined reference value; and a subdivider which divides an area overlapped with the block of a fixed size having the activity greater than the reference value into smaller areas in accordance with the comparison result obtained by the comparator.

The area divider of the moving image coding apparatus further includes: an evaluation value calculating section which calculates an evaluation value of a result of the area division in accordance with a predetermined evaluation method; and a judging section which judges an evaluation value of the area division of an image to be coded based on the area shape of the previous image which is already divided into areas and coded, and determines whether the area shape of the previous image is used.

The judging section of the moving image coding apparatus carries out the area division without using the area shape of the previous image which is already divided into areas and coded, when the evaluation value of the area division of the image to be coded based on the area shape of the previous image exceeds a predetermined reference value.

The judging section of the moving image coding apparatus carries out the area division within the image to be coded, when the evaluation value of the area division of the image to be coded based on the area shape of the previous image which is already divided into areas and coded exceeds the predetermined reference value.

In another aspect of the present invention, a moving image decoding apparatus which receives and decodes coded data of an image which is divided into a plurality of areas, the coded data including division information regarding whether the image is divided using the area shape of a previous image which is already divided into areas and coded, comprises: an area shape decoder which decodes information regarding the area shape based on the division information, and restores the shape of each area divided during coding; and an image data decoder which restores the image of each area from the coded data.

In still another aspect of the present invention, a moving image coding apparatus which divides an input digital image into a plurality of areas with a predetermined method comprises: a coding mode selector which selects a combination of coding modes, based on the size of the area obtained by the area divider; and an encoder which codes from the area divider and outputs coded data, the image signals, motion and attribute information from each area, based on the coding mode selected from the combination of coding modes.

In still another aspect of the present invention, a moving image decoding apparatus which receives and decodes coded data of an image which is divided into a plurality of areas comprises: an image data decoder which restores the shape of each divided area, determines a combination of possible coding modes based on the restored shape of each area, specifies a coding mode for each area based on cord words corresponding to the specified coding mode included in the coded data, and restores the image of each area in accordance with the specified coding mode.

In a further aspect of the present invention, a moving image coding method which divides an input digital image into a plurality of areas with a predetermined method comprises the steps of: storing information representing the shape of the areas; and coding information supplied from the area dividing step and outputting coded data, the information includes the image signals of the areas, motion information, attribute information, information representing the area shape of the input image, and so on. The area dividing step including the steps of: reading the stored area shape of a previously coded and projecting the area shape onto an image to be coded to obtain an initial area shape; dividing each area of the input image into smaller areas in accordance with a predetermined judging method, the initial area shape of the input image being determined by the projecting step; and integrating the areas divided by the dividing step while determining whether or not each area is integrated with an adjacent area in accordance with the predetermined judging method.

The dividing step of the moving image coding method includes the steps of: calculating an activity for each area determined by the projecting step; comparing the activity with a predetermined reference value; and subdividing a particular area having the activity greater than the reference value into smaller areas in accordance with the comparison result obtained by the comparing step.

Also, the dividing step of the moving image coding method includes the steps of: calculating an activity for each block of a fixed size regardless of the shape information; comparing the activity with a predetermined reference value; and subdividing an area overlapped with the block of a fixed size having the activity greater than the reference value into smaller areas in accordance with the comparison result obtained by the comparing step.

The area dividing step of the moving image coding method further includes: calculating an evaluation value of a result of the area division in accordance with a predetermined evaluating method; and judging an evaluation value of the area division of an image to be coded based on the area shape of the previous image which is already divided into areas and coded, and determining whether the area shape of the previous image is used.

The judging step of the moving image coding method carries out the area division without using the area shape of the previous image which is already divided into areas and coded, when the evaluation value of the area division of the image to be coded based on the area shape of the previous image exceeds a predetermined reference value.

The judging step of the moving image coding method carries out the area division within the image to be coded, when the evaluation value of the area division of the image to be coded based on the area shape of the previous image which is already divided into areas and coded exceeds a predetermined reference value.

In a still further aspect of the present invention, a moving image decoding method which receives and decodes coded data of an image which is divided into a plurality of areas, the coded data including division information regarding whether the image is divided using the area shape of a previous image which is already divided into areas and coded, comprises the steps of: decoding information regarding the area shape based on the division information, and restoring the shape of each area divided during coding; and restoring the image of each area from the coded data.

In a still further aspect of the present invention, a moving image coding method which divides an input digital image into a plurality of areas with a predetermined method comprises the steps of: selecting a combination of coding modes, based on the size of the area; and coding image signals and attribute information from each area, based on the coding mode selected from the combination of coding modes.

In a still further aspect of the present invention, a moving image decoding method which receives and decodes coded data of an image which is divided into a plurality of areas, comprises the steps of: restoring the shape of each area divided; and determining a combination of possible coding modes based on the restored shape of each area, specifying a coding mode for each area based on code words corresponding to the specified coding mode included in the coded data, and restoring the image of each area in accordance with the specified coding mode.

DETAILED DESCRIPTION OF THE INVENTION

Embodiment 1

Figure 1:
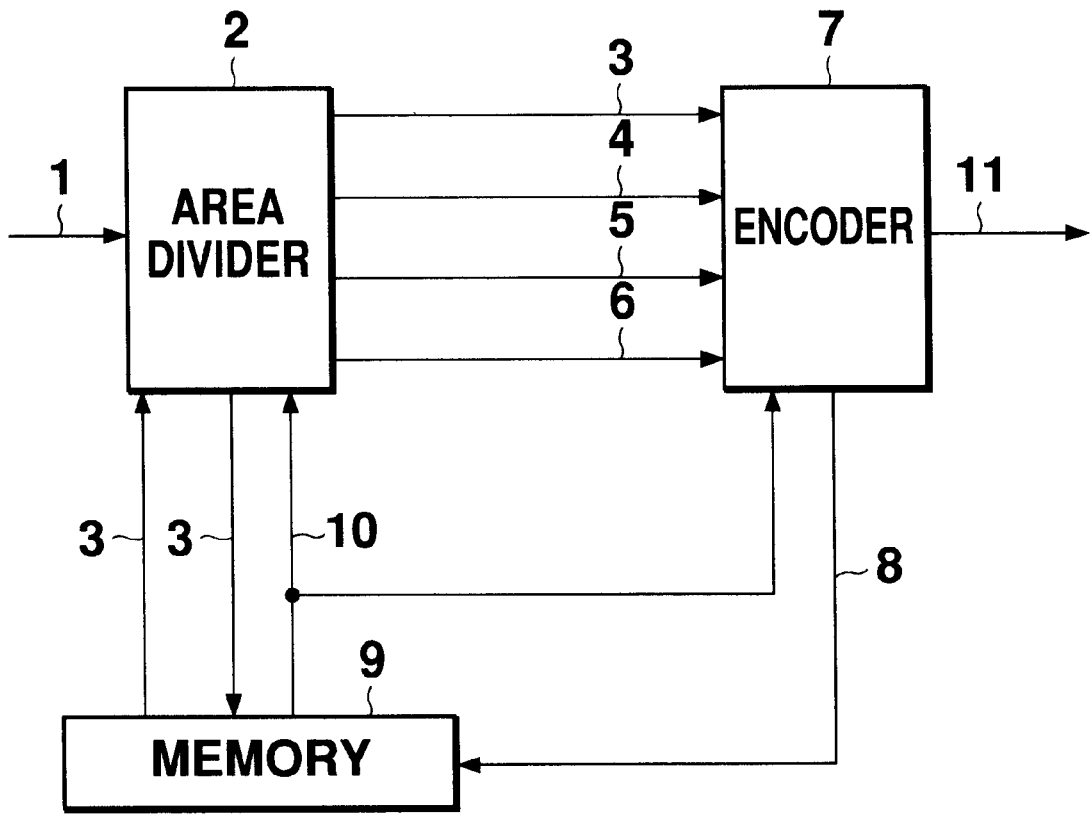
FIG. 1 shows a basic structure used for an apparatus and a method for coding an moving image according to an embodiment of the present invention.
Figure 2:
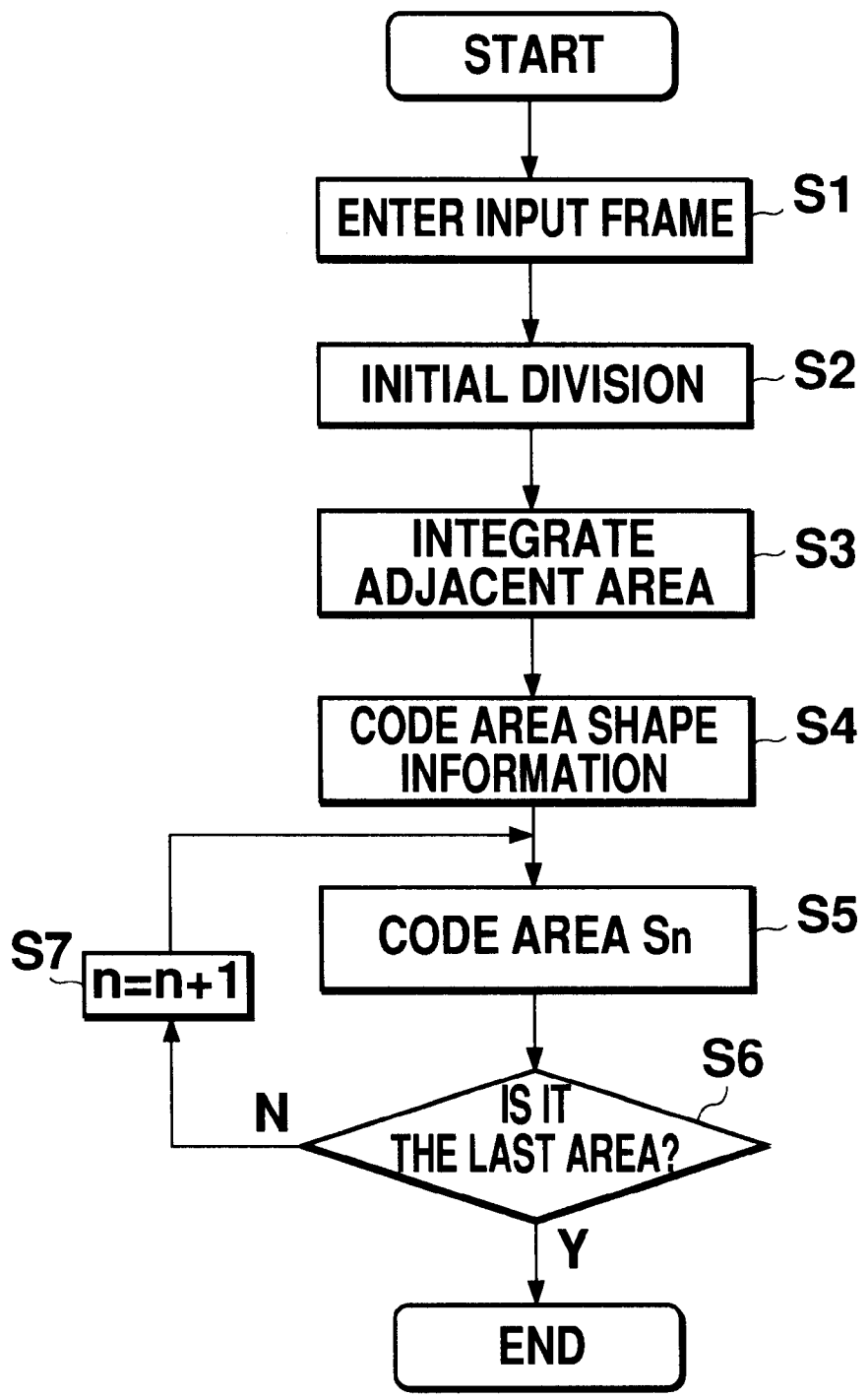
FIG. 2 is a flow chart showing an operation of the coding apparatus and method shown in FIG. 1.

A moving image coding apparatus according to a coding apparatus and its method defined in the following claims 1 and 10 will now be described. FIG. 1 is a block diagram illustrating a structure of a moving image coding apparatus according to the embodiment. In the figure, a reference numeral 1 is an input image, 2 is an area divider, 3 is area shape information, 4 is an area image signal, 5 is motion information of an area, 6 is attribute information, 7 is an encoder, 8 is a local decoded image, 9 is a memory, 10 is a difference image, and 11 is a coded bit stream. FIG. 2 is a flow chart illustrating an operation of the coding apparatus.

Referring to FIGS. 1 and 2, the apparatus operates in the following manner. The input image 1 is input to the area divider 2 (S1), where the area shape information 3 of an image (a reference image) is read from the memory 9. The reference image has been divided into areas and coded in a frame immediately preceding to the current frame. Then, two processing lines, i.e., an initial division (S2) and an integration of adjacent areas (S3) are activated using the acquired area shape information as an initial shape. The operation of the area divider 2 will be detailed later. The area divider 2 provides the encoder 7 with such information as the area shape information 3 indicating the input image divided into areas, the image signal 4 for each area, the motion information 5 for each area, and the attribute information 6 including a coding mode of each area. The area shape information 3 is also stored in the memory 9, so that the information 3 can be used as an initial division state for the next frame to be divided and coded. The encoder 7 converts these information into bit patterns in accordance with a suitable coding system, multiplies these bit patterns, and outputs the result as the bit stream 11 (S4, S5). Also, the encoder 7 produces the local decoded image 8 for each area in order to carry out the area division and coding process based on the motion compensative prediction, and stores the image 8 in the memory 9. The area divider 2 and the encoder 7 execute the motion compensative prediction by reading the local decoded image 8 stored in the memory 9 as the difference image 10. However, as the motion compensative prediction is already carried out in the area dividing process, another motion compensative prediction is unnecessary by the encoder 7.

An detailed operation of the area divider 2 which is a major element of the present invention will be described.

Figure 3:
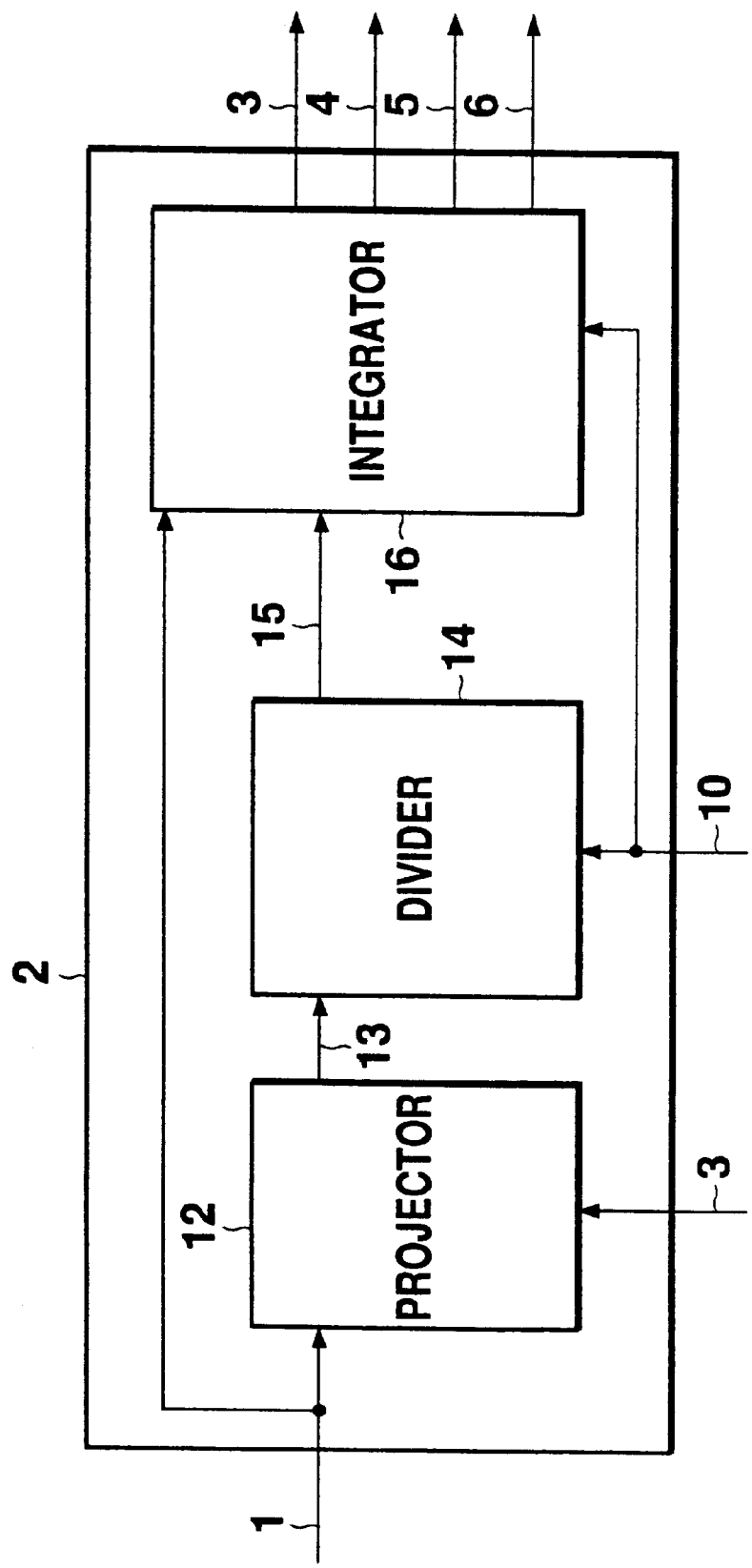
FIG. 3 shows an internal structure of the area divider shown in FIG. 1.

FIG. 3 illustrates a detailed structure of the area divider 2 in accordance with the embodiment. In FIG. 3, a reference numeral 12 is a projector, 13 is initial shape information, 14 is a divider, 15 is divided shape information, and 16 is an integrator.

Figure 4:
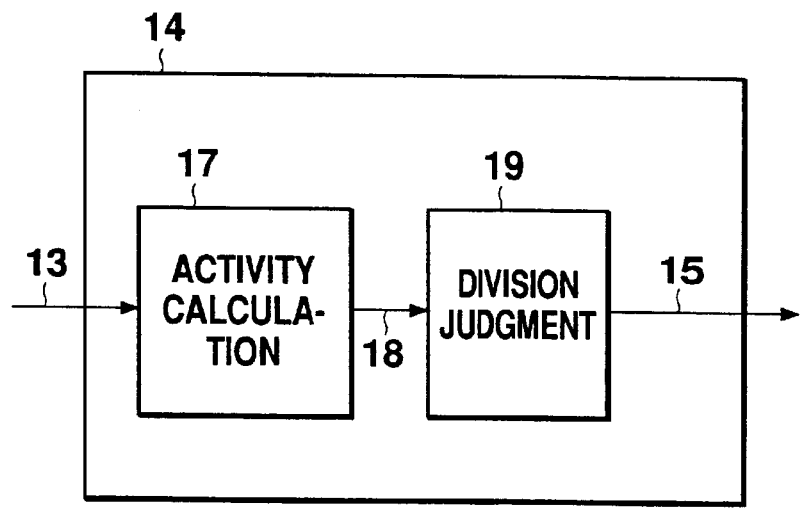
FIG. 4 shows an internal structure of the divider shown in FIG. 3.
Figure 5:
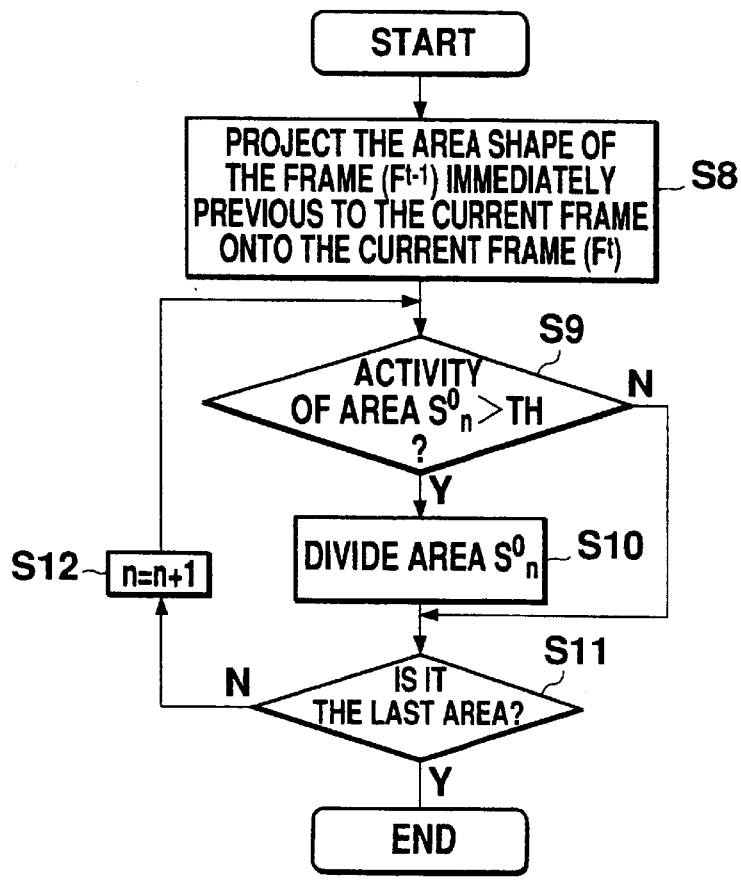
FIG. 5 is a flow chart showing an operation of the projector shown in FIG. 3 and the divider shown in FIG. 4.

FIG. 4 shows an internal configuration of the divider 14. In FIG. 4, a reference numeral 17 is an activity calculating unit, 18 is an activity, and 19 is a division judging unit. FIG. 5 is a flow chart showing the operation of the projector 12 and the divider 14.

The divider 14 of the embodiment carries out division in accordance with an activity as defined in claim 2. An activity is a piece of numerical data regarding a predetermined property of image information for use in determining a feature or characteristic of the image.

Figure 6:
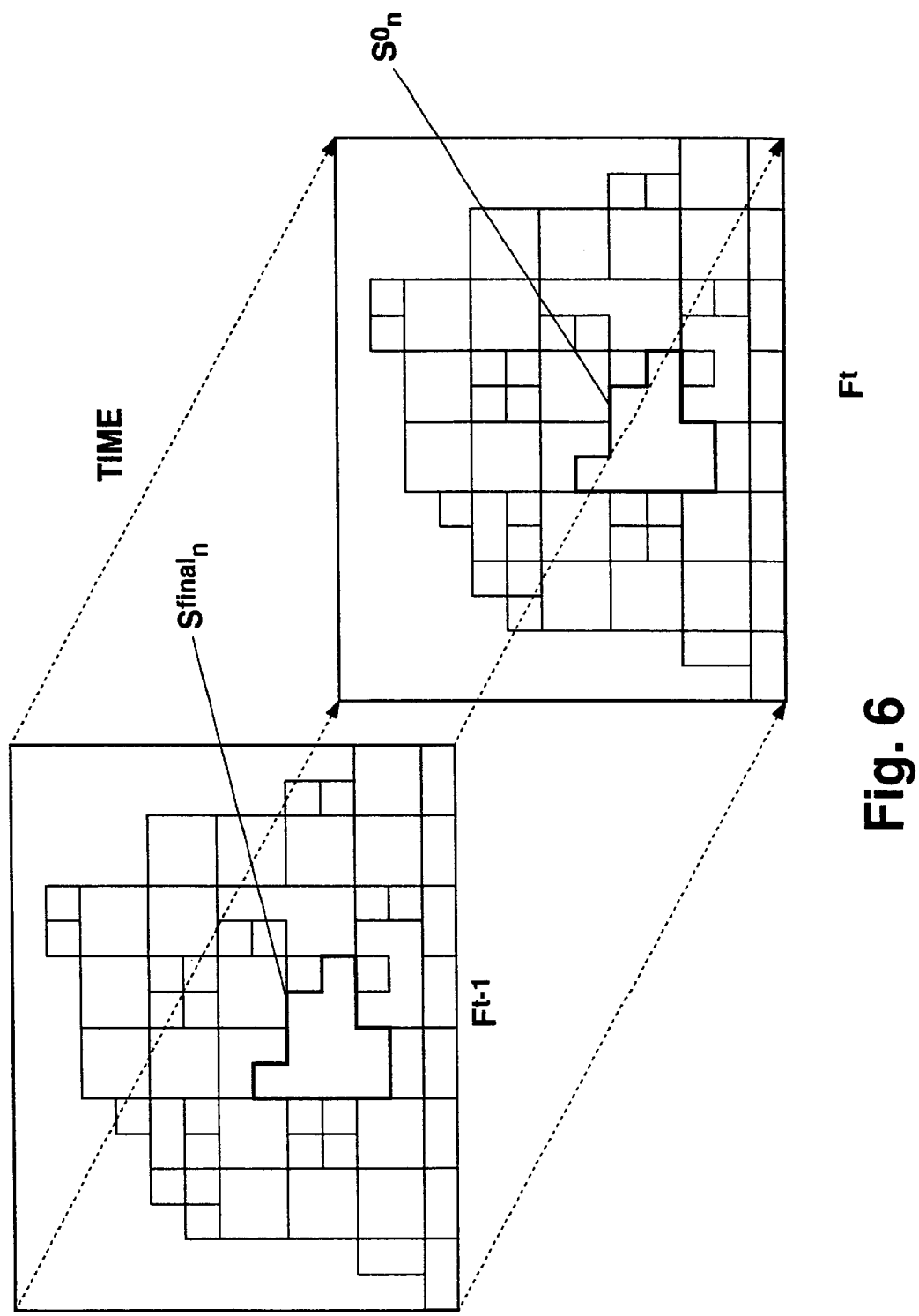
FIG. 6 shows an example of projecting an area shape by the projector shown in FIG. 3.

Assume that $F^t$ represents an image to be coded and $F^{t-1}$ represents an image which is already divided into areas and coded in the frame immediately previous to the current frame. The projector 12 reads the area shape information 3 of $F^{t-1}$ from the memory 9, projects it onto $F^t$ (S8), and supplies the projected area shape to the divider 14 as the initial shape information 13. For example, the final area shape of $F^{t-1}$ ($S^{final}_n$) is projected as shown in FIG. 6. The number of areas included in $F^t$ is $N_0$, and each area is represented as $S^0_n (1 \leq n \leq N_0)$. To determine whether or not a further division should be carried out (S9), the activity calculating unit 17 calculates the activity of each area. The activity is expressed as the cost of the amount of coding rate and distortion ($L(S^0_n)$) by:

$$L(S^0_n) = D(S^0_n) + \lambda R(S^0_n)$$

where $D(S^0_n)$ is the coding distortion of $S^0_n$, $R(S^0_n)$ is the amount of codes of $S^0_n$, and $\lambda$ is a constant.

Figure 7:
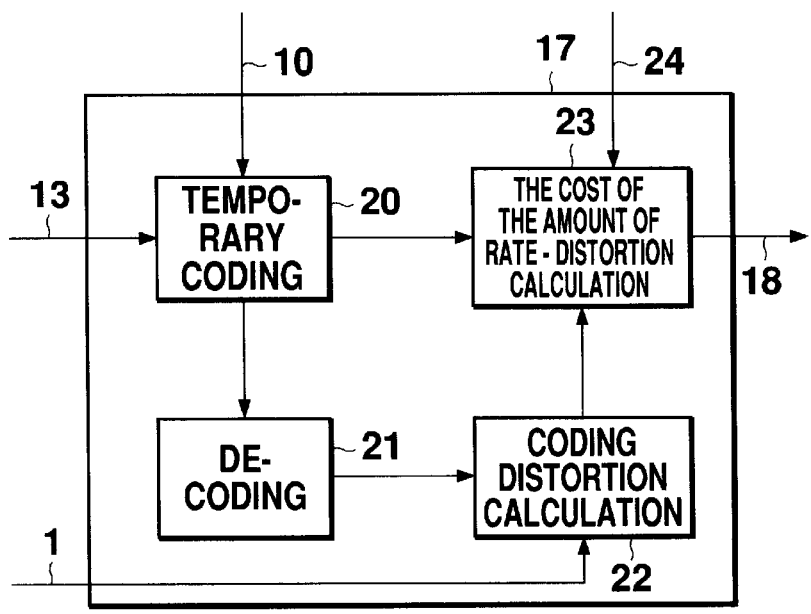
FIG. 7 shows an internal structure of the activity calculating unit shown in FIG. 4.

FIG. 7 shows an internal configuration of the activity calculating unit 17. In the figure, a reference numeral 20 is a temporary coding section, 21 is a decoding section, 22 is a coding distortion calculating section, 23 is a section for calculating the cost of the amount of coding rate and distortion, and 24 is a constant.

Figure 8:
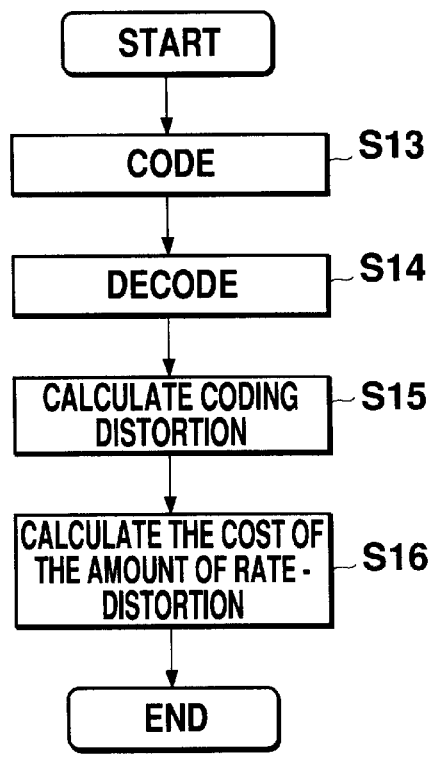
FIG. 8 is a flow chart showing an operation of the activity calculating unit show in FIG. 7.

FIG. 8 is a flow chart showing the operation of the activity calculating unit.

The temporary coding section 20 codes $S^0_n$ (S13) to determine a local decoded image used in calculating the coding distortion $D(S^0_n)$, as well as determining the amount of codes $R(S^0_n)$. In the embodiment, the temporary coding section 20 codes the areas by means of motion compensative prediction using the difference image 10 stored in the memory 9. The data to be coded include image data, i.e., motion information and attribute information such as a coding mode. These information are used for specifying a prediction error signal, the original signal, or a prediction image. The sum of these codes equals to $R(S^0_n)$. The prediction error signal is determined as a difference between the original signal and the prediction image which results from the retrieval of motion parameters.

The decoding section 21 generates a local decoded image using the coded data obtained by the temporary coding section 20 (S14). Then, the coding distortion calculating section 22 calculates a distortion $D(S^0_n)$ between the local decoded image and the original image (S15). The section 23 calculates the cost $L(S^0_n)$, which is defined above, from the amount of codes $R(S^0_n)$ determined by the temporary coding section 20, the distortion $D(S^0_n)$ determined by the coding distortion calculating section 22, and the constant 24 (S16). The calculated value of $L(S^0_n)$ is then supplied to the division judging unit 19 as the activity 18.

Figure 9:
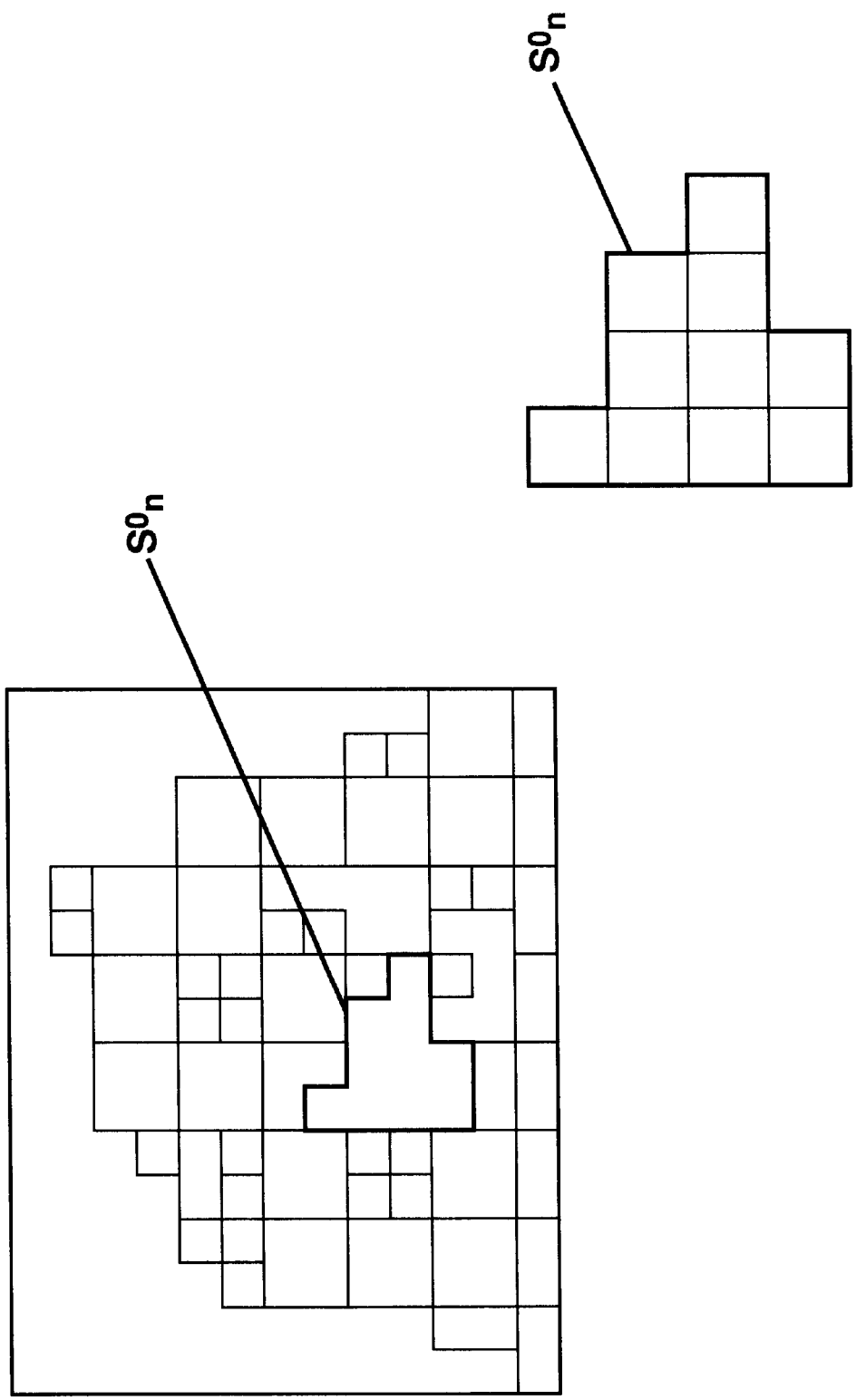
FIG. 9 shows an example of areas which are equally divided by the divider shown in FIG. 4.

After that, the division judging unit 19 compares the activity 18 with a predetermined threshold value TH to determine whether $S^0_n$ should be further divided (S9). The division judging unit 19 functions as a comparator in the present invention. When the activity 18 is greater than the threshold value TH, the corresponding $S^0_n$ is divided. In other words, the division judging unit 19 also serves as a group divider in the present invention. The area is divided by, for example, equally dividing the area into the smallest blocks which constitute the area, as shown in FIG. 9. Alternatively, the block size can be changed depending on the area size.

Each area is now represented as a divided area $S^1_n$. This division state is notified to the integrator 16 as the divided shape information.

The integrator 16 integrates each $S^1_n$ with adjacent areas.

After the dividing the integrating processes are completed, the encoder 7 receives the information 3 representative of the final area division state of the input image 1, the image signal 4 of each area, the motion information 5, and the attribute information 6.

The information 3 representative of the area division state includes the area shape information. The area shape information is expressed by the information regarding the dividing and the integrating processes. Based on this information, the decoder side carries out the same processes as in the coding apparatus to thereby retrieve the area shape. If the area shape of the image, which has been divided into areas and coded in the frame immediately previous to the current frame, is used as the initial shape, it is sufficient to code and transmit the information of only the subdivided areas with respect to positions and the dividing process of these areas. In other words, it is not necessary to transmit the dividing process information of other areas which are not subdivided. This does not only reduce the amount of area shape information, but also save time for the dividing process in such scene as a TV conference.

With the aid of the area divider 2 including the above-mentioned projector 12, this system allows the reduction of both the amount of calculations involved during the area dividing process and the amount of codes used for the area shape, compared to another area dividing process which uses an unconditionally equally-divided image as the initial shape, rather than using the area shape of the frame immediately previous to the current frame.

Although the cost of the amount of codes minus distortion is used as the activity in the embodiment, other values can be also used.

Figure 10:
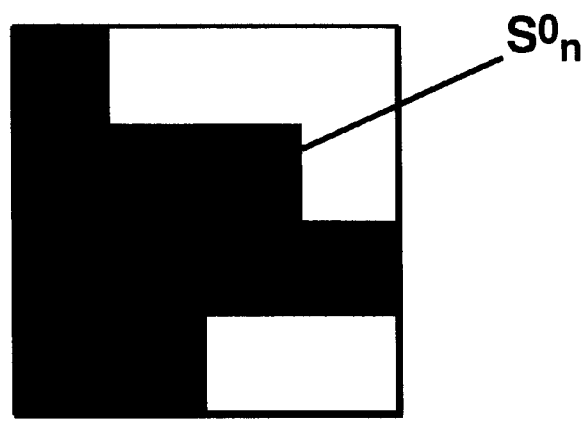
FIG. 10 shows an example of a rectangle circumscribing an area.
Figure 11:
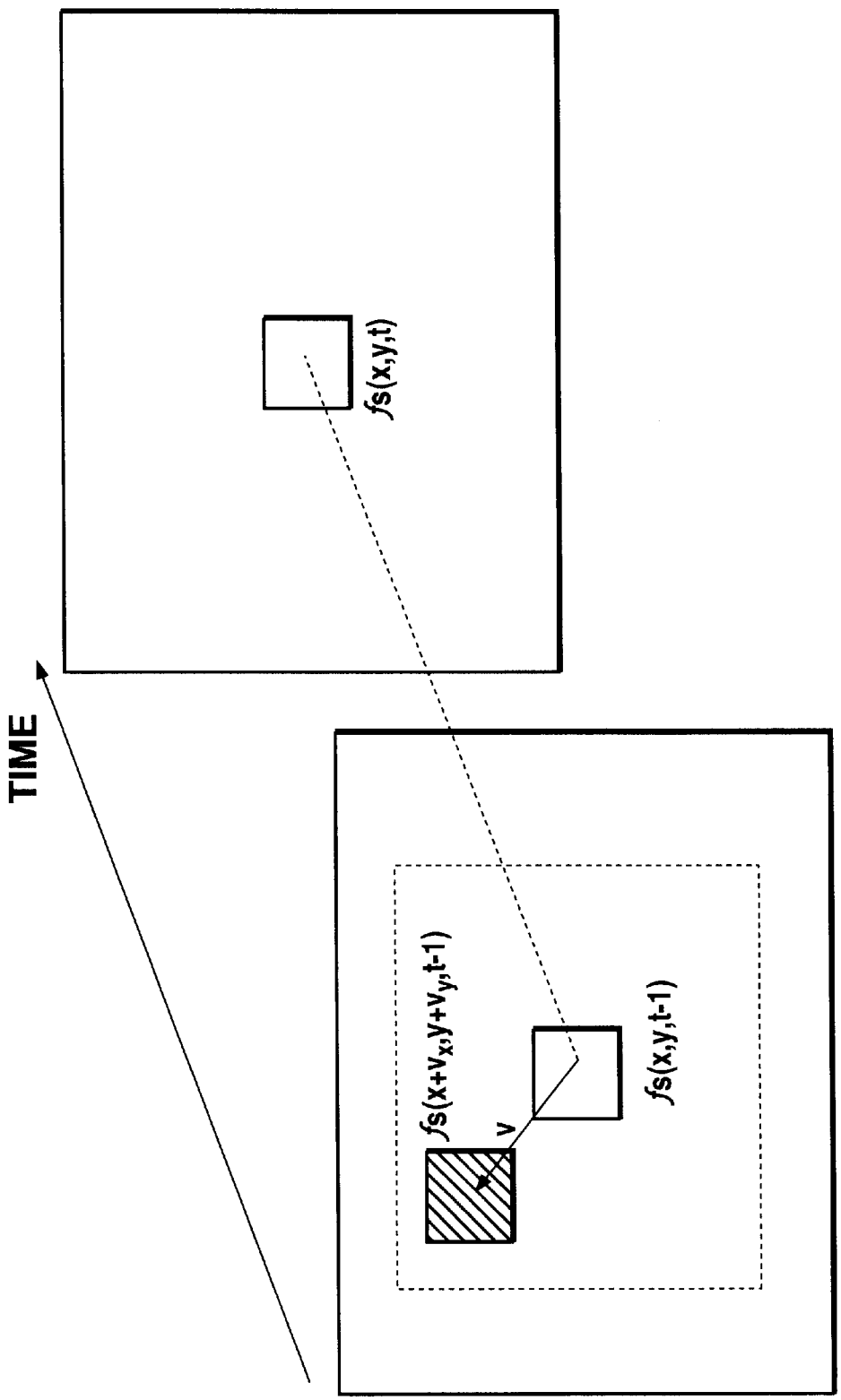
FIG. 11 shows a motion compensative prediction by means of block matching.

The first alternative value is a prediction error power associated with the motion compensative prediction of areas. The motion compensative prediction is carried out by means of block matching. In order to apply the usual block matching method, one rectangle is defined to circumscribe each area as shown in FIG. 10, as each area is in an arbitrary shape, so that the block matching can be carried out for each rectangle. FIG. 11 shows the motion compensative prediction method by means of block matching. During the block matching, a vector V is determined as a motion vector of a predicted area S as follows:

$$D_{min} = \min_{v \in R} \left( \sum_S [f_S(x+v_x, y+v_y, t-1) - f_S(x, y, t)] \right)$$

where $f_s(x, y, t)$ represents a pixel value at (x, y) of the predicted area S at time t, $f_s(x, y, t-1)$ represents a pixel value at (x, y) at time t−1, and $f_{s(x+v_x, y+v_y, t-1)}$ represents a pixel value at a position displaced from a position (x, y, t−1) by the vector v. Also, R represents a region where the motion vector is searched.

Based on the resulting vector, the prediction image can be determined as $f_s(x+v_x, y+v_y, t-1)$, and the prediction error power, or the activity, is determined as Dmin. With the activity defined in this way, the motion compensative prediction is carried out using the area shape determined by the area dividing and coding process in the frame immediately previous to the current frame. As a result, the areas having larger prediction errors are subdivided so as to change their area shape.

The second alternative is a variance value within the area. A variance value represents the complexity of the pixel distribution of the area. Thus, the variance value increases in the area including such image as edges where pixel values change abruptly. Assuming a pixel value within the area S is $f_s$ (x, y, t), and an average of the pixel value is $\mu$ S, then a variance value σ S within the area will be:

$$\sigma_S = \frac{1}{N} \sum_S (f_S(x, y, t) - \mu_S)^2$$

With this activity, it is possible to subdivide the area which may include edges and change its area shape, by using the area shape of the image divided and decoded in the frame immediately previous to the current frame.

The third alternative is an edge strength within the area. An edge strength can be determined by, for example, Sobel operator which is described in G. Robinson, "Edge detection by compass gradient masks", Journal of Computer Graphics and Image Processing, Vol. 6, No. 5, October 1977, or determined as the number of pixels distributed on edges (the edge distribution area). With this activity, it is possible to detect edges from the area including edges, and subdivide the area and change its area shape in accordance with the detection result, by using the area shape of the image divided and coded in the frame immediately previous to the current frame.

The fourth alternative is a linear sum of the aforementioned activity values. By appropriately weighing each activity value, it is applicable to various images.

Embodiment 2

Figure 12:
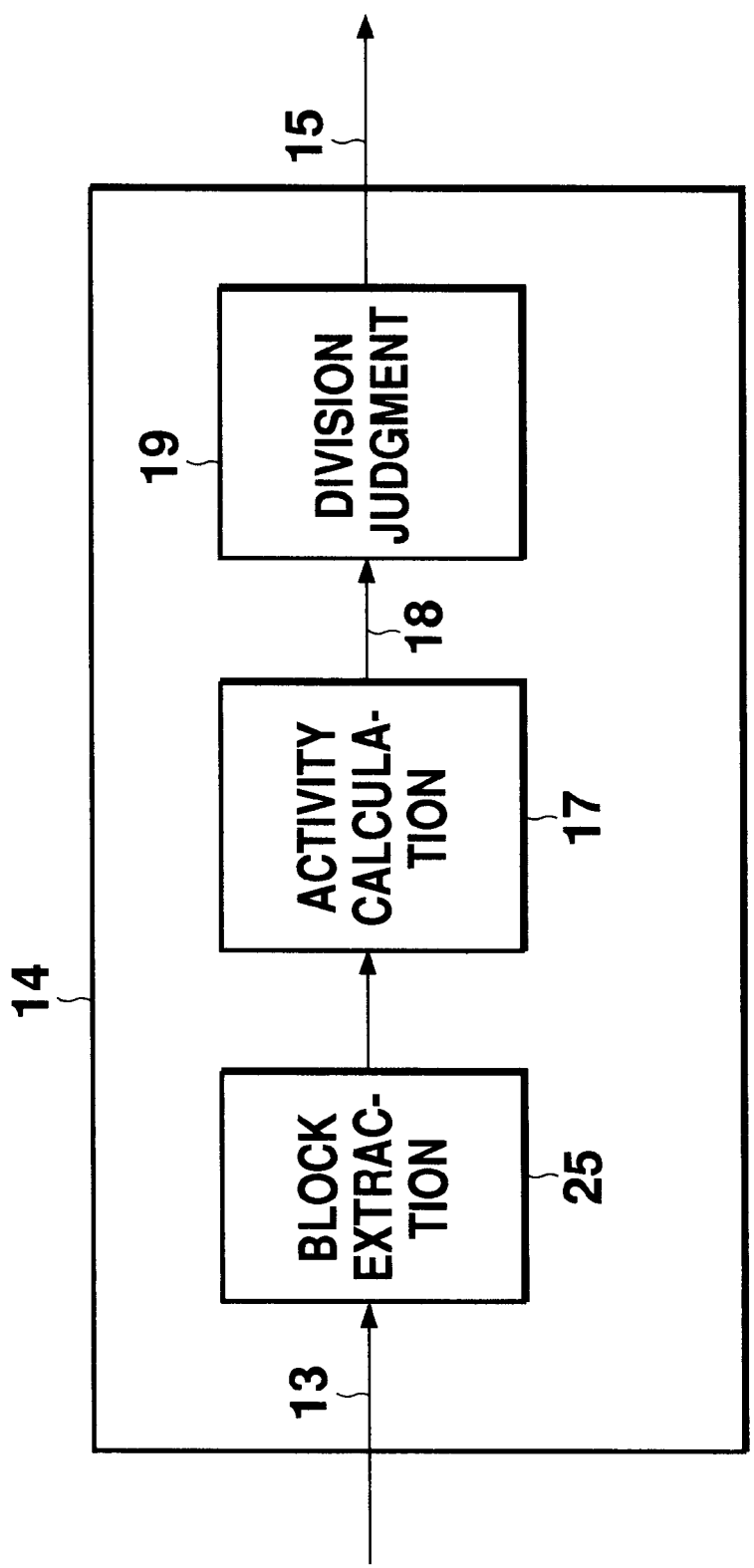
FIG. 12 shows an alternative embodiment of the divider shown in FIG. 3.
Figure 13:
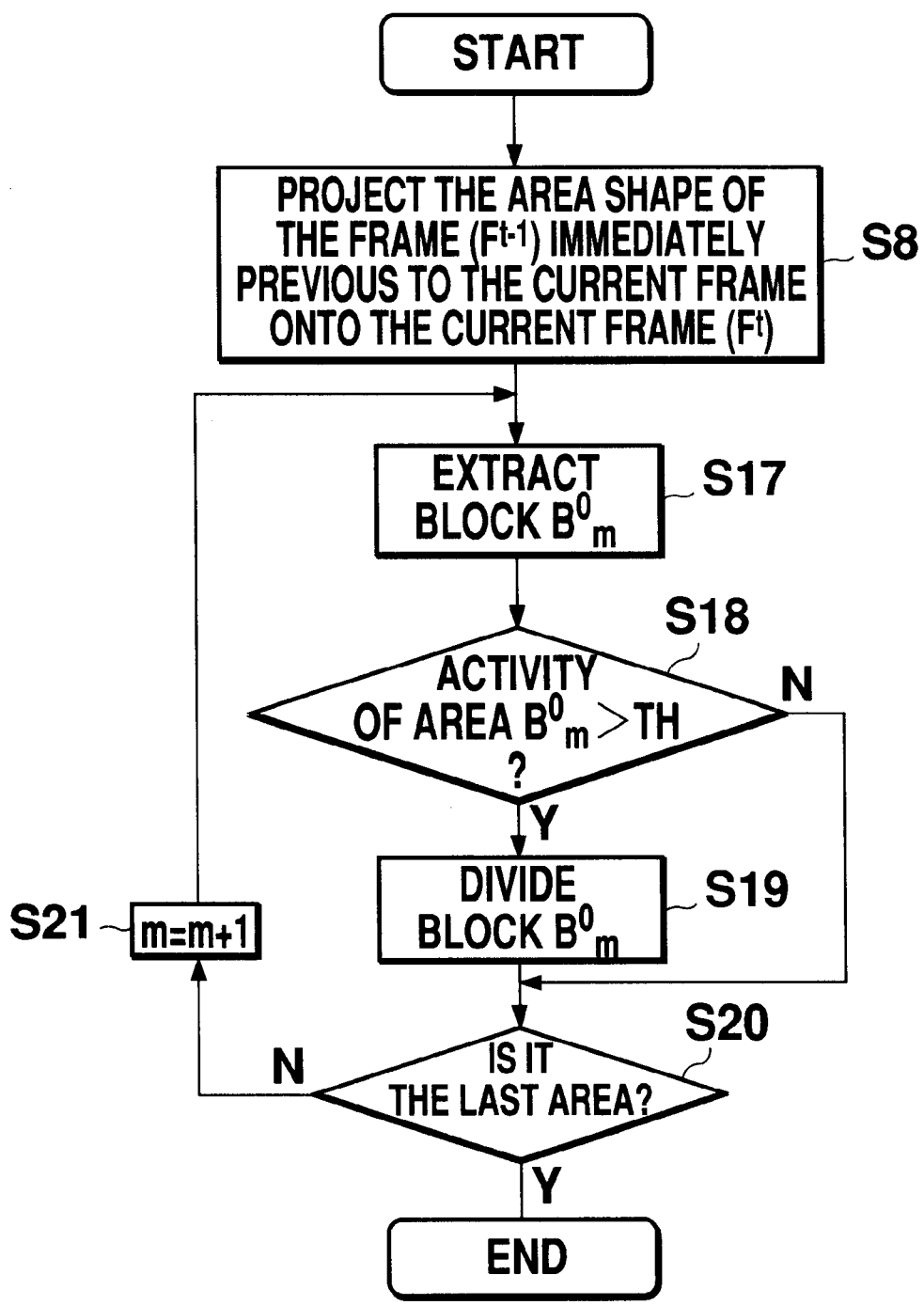
FIG. 13 is a flow chart showing an operation of the divider shown in FIG. 12.

A moving image coding apparatus in accordance with a coding apparatus and its method defined in claims 3 and 12 will now be described. The structure of the moving image coding apparatus according to the embodiment is the same as that described in the embodiment 1, except for the divider 14. Therefore, only the divider 14 will be described below. FIG. 12 shows an internal configuration of the divider 14 according to the embodiment. A block extracting unit is indicated by a reference numeral 25. FIG. 13 is a flow chart illustrating the operation of the divider 14 shown in FIG. 12.

Figure 14:
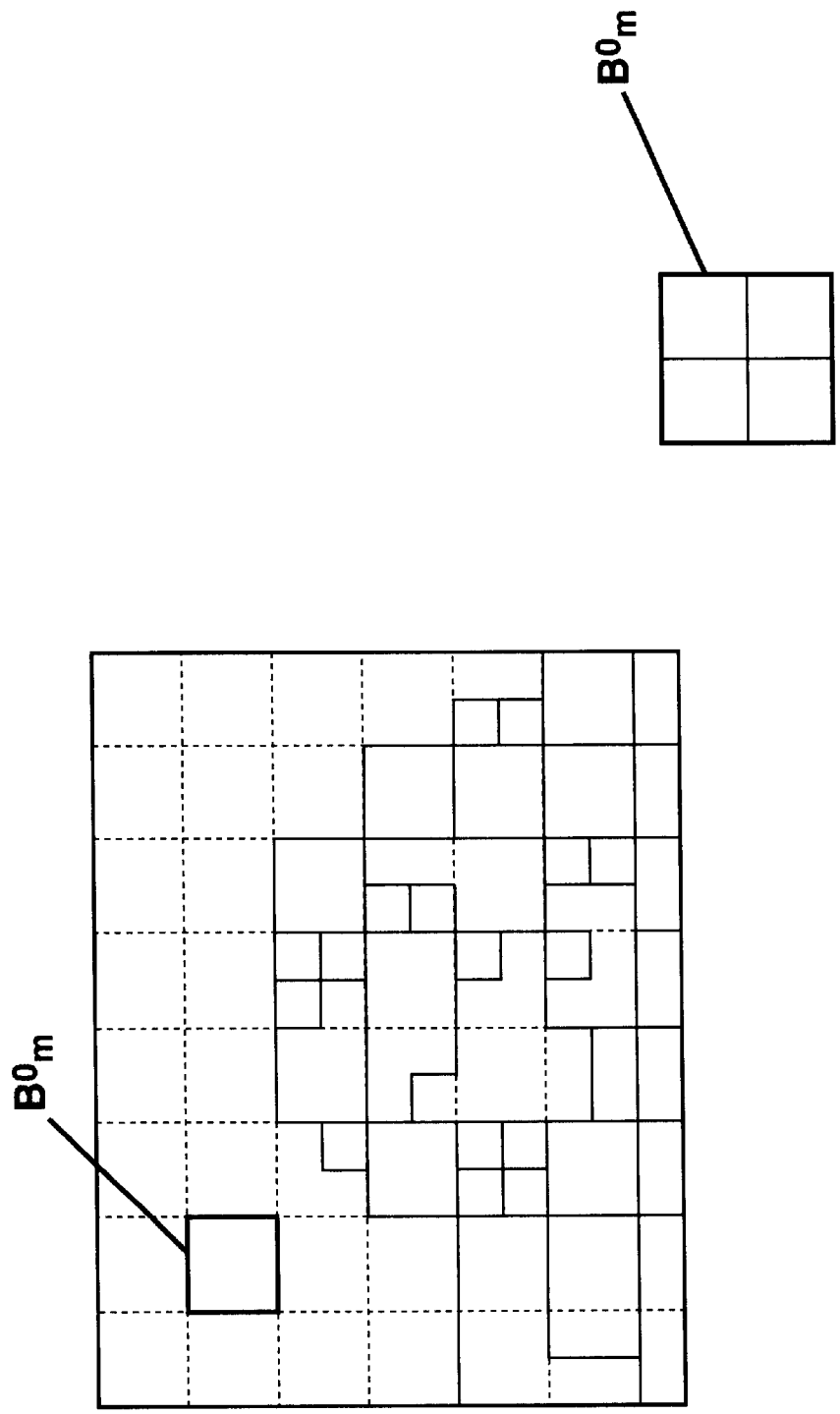
FIG. 14 shows an example of blocks used in the equal division by the divider shown in FIG. 12.

In the embodiment, the divider 14 extracts blocks of a fixed size ($B^0_m$) by the block extracting unit 25, irrespective of the projected area shape (S17), and calculates an activity for each block. Then, a division judging unit 19 compares the resulting activity 18 with a predetermined threshold value TH (S18). When the activity 18 of certain blocks is greater than the threshold value TH, only those areas which are overlapped with such blocks are divided (S19), for example, by equally dividing the area, as shown in FIG. 14.

In the embodiment, the activity is calculated irrespective of the area shape. Therefore, if some change happens in part of a large area, it is possible to detect only the changed part and divide it.

Embodiment 3

Figure 15:
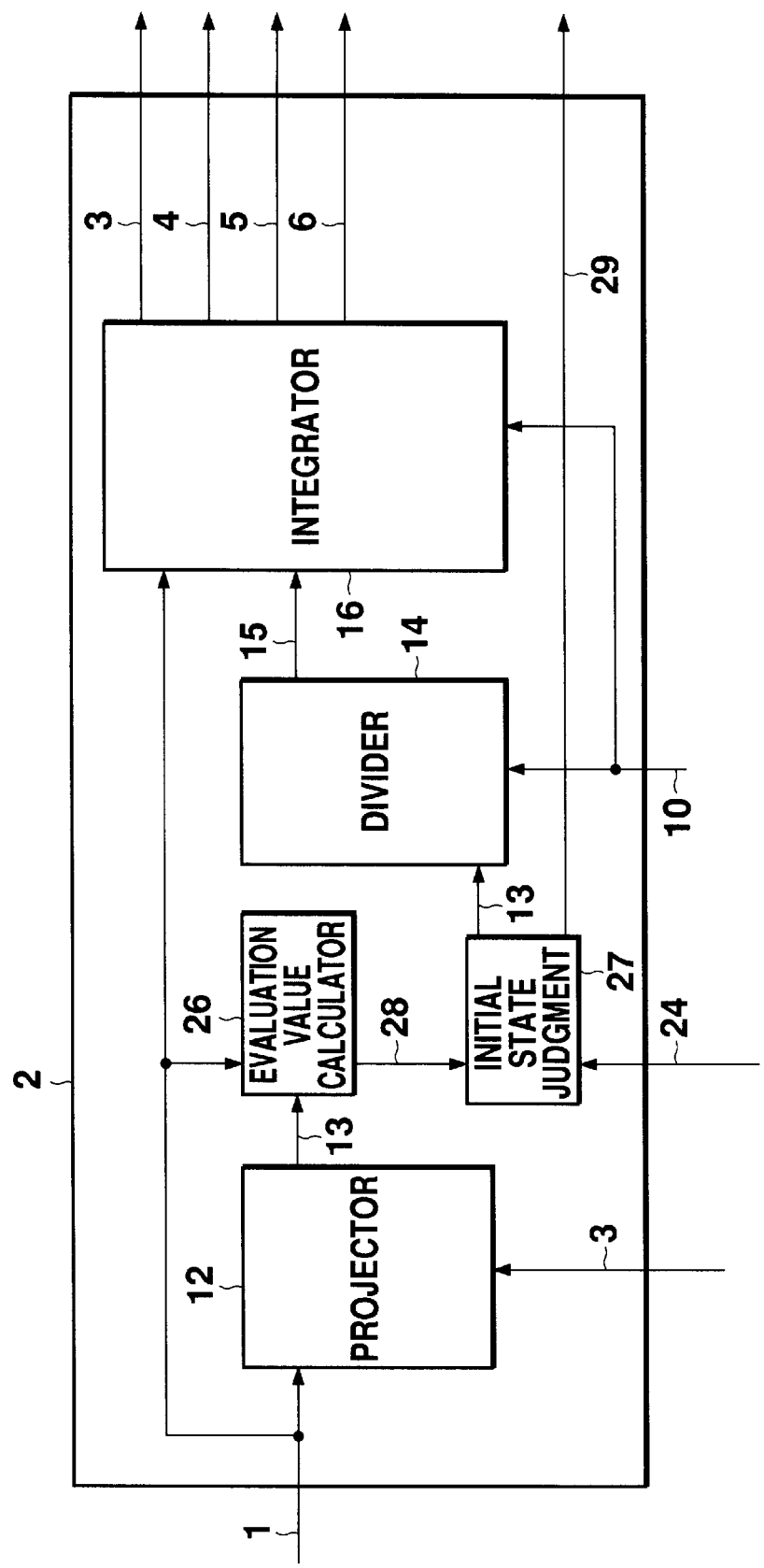
FIG. 15 shows an alternative embodiment of the area divider shown in FIG. 3.

A moving image coding apparatus in accordance with a coding apparatus and its method defined in claims 4 and 13 will be described. The structure of the apparatus according to the embodiment is the same as the structure of the moving image coding apparatus described in the embodiment 1, except for the area divider 2. Thus, only the area divider 2 will be described below. FIG. 15 shows an internal structure of the area divider 2 according to the embodiment. In the figure, a reference numeral 26 is an evaluation value calculator, 27 is an initial state judging element, 28 is an evaluation value, and 29 is a flag for determining an initial state.

Figure 16:
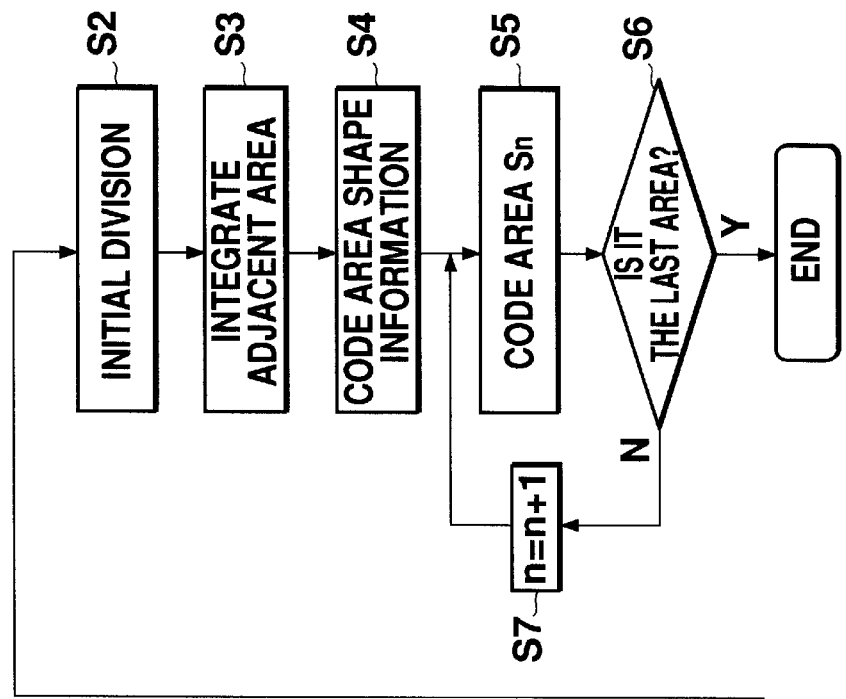
FIG. 16 is a flow chart showing an operation of the area divider shown in FIG. 15.
Figure 16:
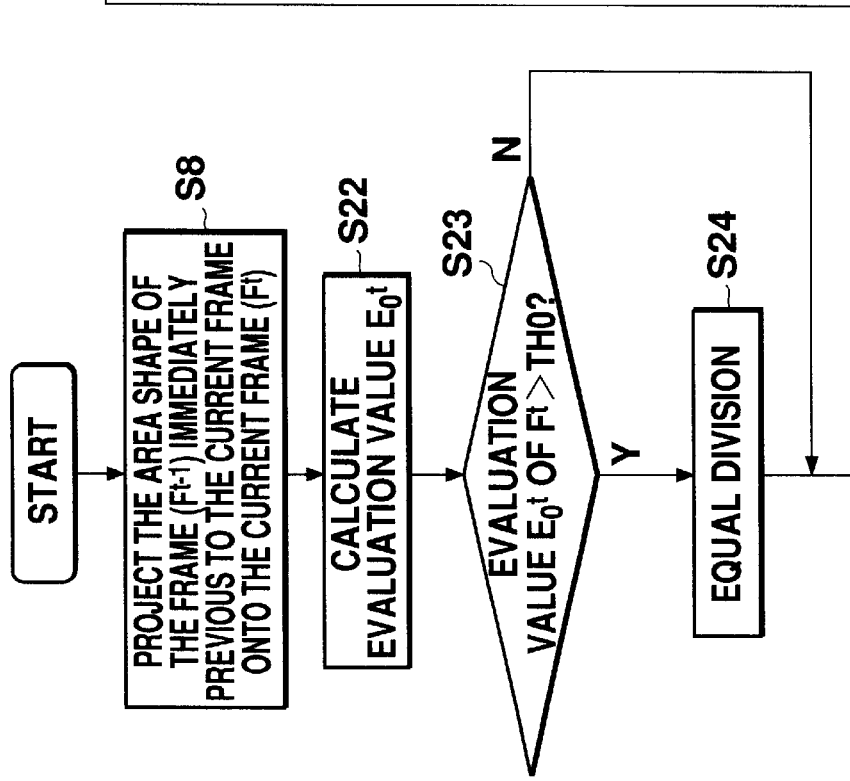

FIG. 16 is a flow chart showing the operation of the area divider 2 having the configuration shown in FIG. 15.

In the embodiment, the area divider 2 calculates an evaluation value (represented as $E^0_t$) of $F^t$(S22). Ftis obtained by projecting the area shape of $F^{t-1}$ by the projector 12, and is divided into areas based on the area shape. The evaluation value is expressed by, for example, the sum L of the costs of the amount of codes minus distortion $L(S_K)$, which are determined for each area $S_K$ ($1 \leq k \leq N$) as described in the embodiment 1, as follows:

$$L = \sum_{k=1}^{N_0} L(S_k)$$

Based on the evaluation value, the initial state judging element 27 determines whether the area shape of $F^{t-1}$ should be used as the initial state. In practice, the evaluation value is judged by comparing it with a threshold value (S23). If the evaluation value $E^0_t$ exceeds a predetermined threshold value TH0, the frame is divided regardless of the state of the frame which is immediately previous to the current frame. For instance, instead of the area shape of $F^{t-1}$, it is possible to use the state in which the entire frame is equally divided into blocks of a fixed size as the initial state. After the threshold value judgment, the information of whether or not the area shape of $F^{t-1}$ is used is supplied to the encoder 7 as the flag 29 for determining the initial state.

Alternatively, if $E_0^t$ is greater than the threshold value TH0, it is also possible to divide and code the frame using only the in-frame information. For example, the variance value within the area can be used as the activity. The variance value is described in the embodiment 1.

Using the variance value as the in-frame information, the area division can be carried out in accordance with the local complexity of structure of the image.

Alternatively, two threshold values may be provided, such that the area dividing method is switched between the method using only the in-frame information and the method using both in-frame and inter-frame information.

Assume predetermined threshold values are TH1, TH2 (TH1>TH2). As described above, if the $E_0^t$ exceeds the threshold value TH1, only the in-frame information is used for the area division. If TH2<$E_0^t$≦TH1, the cost of the amount of codes minus distortion, which is determined by the motion compensative prediction, and the prediction error power are used for the area division.

In the embodiment, if a movement between frames is large, and it is useless to use the area shape of the frame immediately previous to the current frame, the area division can be carried out without using such an area shape.

In addition, the embodiment can achieve the adaptive coding process which better corresponds to the contents of images. For instance, the area dividing method is switched to the method using only the in-frame information if a scene change is detected based on the evaluation value.

Embodiment 4

Figure 17:
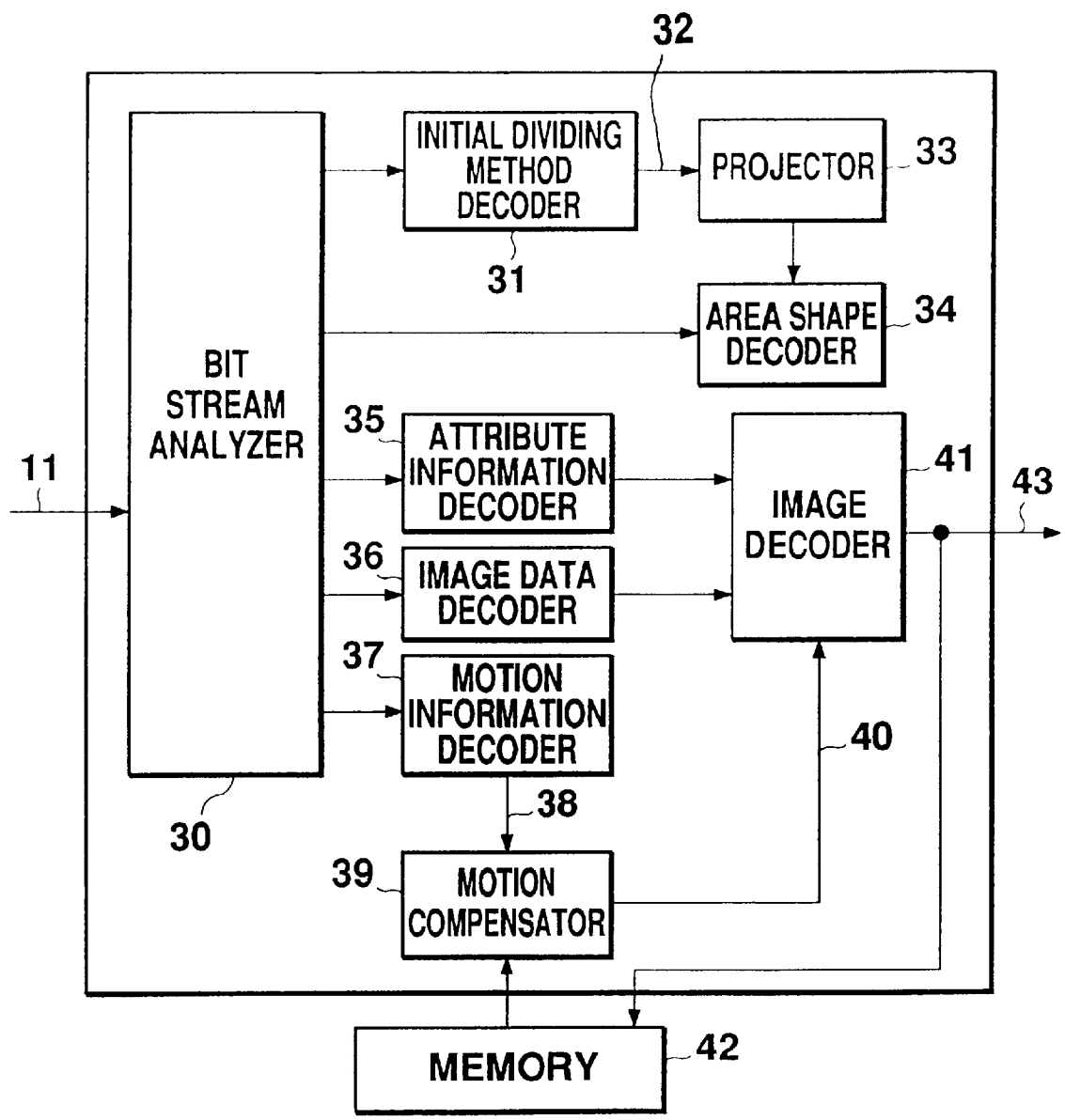
FIG. 17 shows an internal structure of a moving image deco ding apparatus according to an embodiment of the present invention.

A moving image decoding apparatus which decodes a coded bit stream will now be described. The bit stream is generated by the above-mentioned moving image coding apparatus which carries out the area division using the area shape of the frame immediately previous to the current frame. FIG. 17 shows a structure of a decoder in accordance with the embodiment.

In FIG. 17, a reference numeral 30 is a bit stream analyzer, 31 is an initial dividing method decoder, 32 is an initial dividing method flag, 33 is a projector, 34 is an area shape decoder, 35 is an attribute information decoder, 36 is an image data decoder, 37 is a motion information decoder, 38 is a motion parameter, 39 is a motion compensator, 40 is a prediction image, 41 is an image decoder, 42 is an external memory, and 43 is a restored image Initially, the decoding apparatus according to the embodiment decodes the information regarding the area dividing method. Specifically, the apparatus decodes the information with respect to whether a particular image frame, or part of the frame, is divided using an image or part of the image divided and coded in the frame immediately previous to the current frame, or otherwise coded using only in-frame information. In accordance with the information, the apparatus then decodes the coded bit stream which represents the area shape which, in turn, indicates the area division state. Subsequently, the apparatus decodes another coded bit stream consisting of the image data, the attribute information, and the motion information of each area, all of which have been coded by a predetermined coding method. Also, the apparatus decodes the area image and restores the image frame, or a partial image area of the frame.

In the embodiment, the area shape is described by specifying the dividing and the integrating processes during coding. The dividing process is specified by scanning areas in a predetermined order, and identifying whether the division is carried out for respective areas. The integrating process is also described in the same manner. If the area division is carried out using the area shape of the frame immediately previous to the current frame, it is sufficient to describe the position information and the dividing process with respect only to the areas which are actually divided. If the area shape of the frame immediately previous to the current frame is used, the decoding apparatus also projects such an area shape onto the image to be coded, as in the coding apparatus, to thereby retrieve the final area division state based on the information regarding the dividing and the integrating processes.

Figure 18:
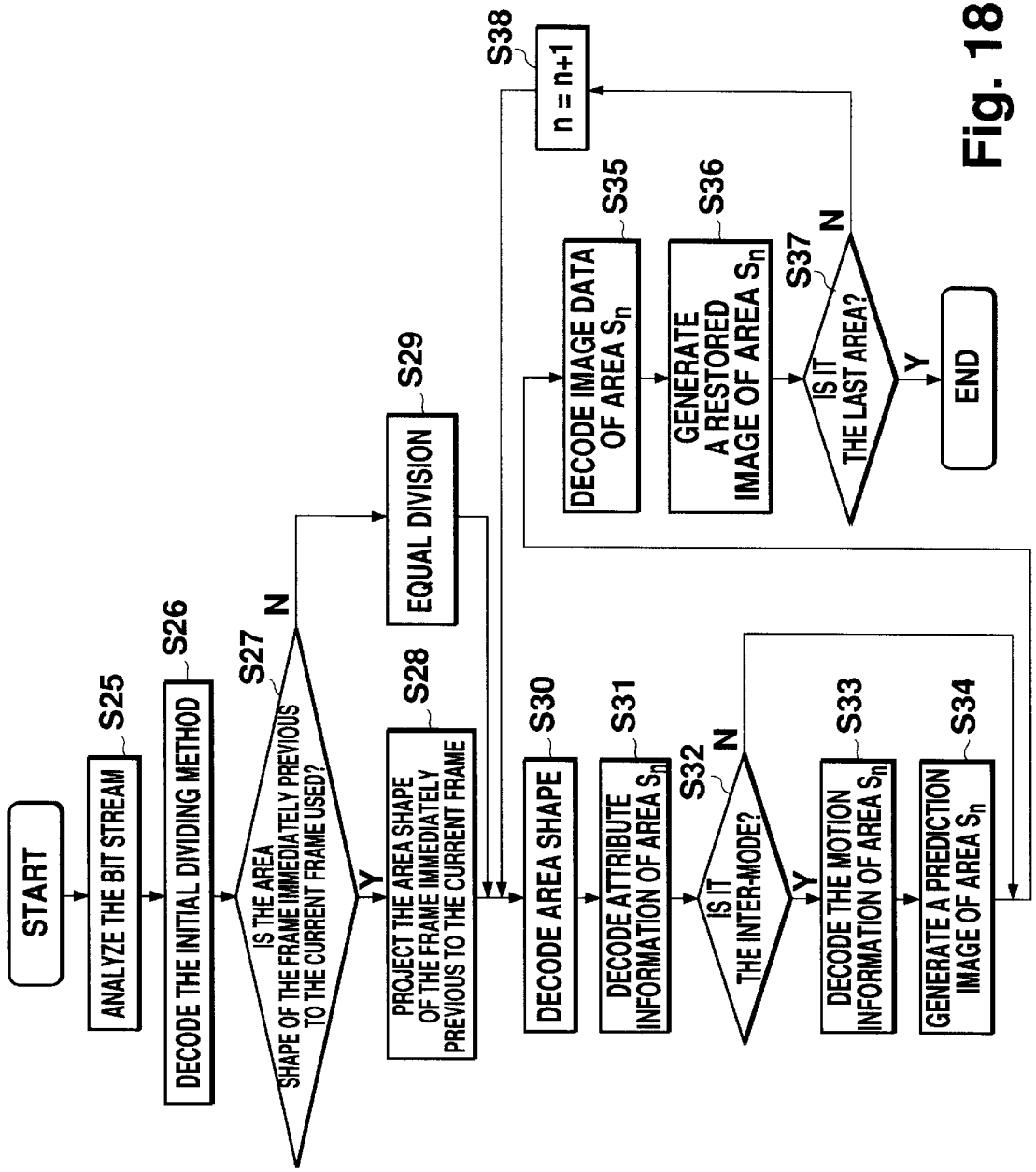
FIG. 18 is a flow chart showing an operation of the decoding apparatus shown in FIG. 17.

FIG. 18 is a flow chart showing the operation of the decoding apparatus in accordance with the embodiment.

First, the coded bit stream 11 is input to the bit stream analyzer 30 which converts the bit stream into coded data (S25). Among the coded data, an initial dividing method flag is decoded in the initial dividing method decoder 31 (S26). Based on the flag, it is determined whether the area shape of the frame immediately previous to the initial dividing method flag should be used (S27). If affirmative, the projector 33 projects the area shape of the frame immediately previous to the current frame (S28). If negative, the area is equally divided into blocks of a fixed size, as in the coding apparatus (S29). Subsequently, the area shape information is decoded by the area shape decoder 34, whereby the area dividing state of the image frame, or a partial image of the frame, is decoded (S30). As the area is now decoded, the coding order of the area information included in the subsequent part of the bit stream is specified. Each area is denoted as $S_n$.

After that, the data for respective areas is decoded in turn from the bit stream in accordance with the coding order First, the attribute information decoder 35 decodes the attribute information of the area $S_n$, whereby the information such as the coding mode of the area is decoded (S31). In the case of an inter-mode which codes the prediction error signals, a motion parameter is decoded in the motion information decoder 37 (S33). Obtained motion parameter is sent to the motion compensator 39 which uses the parameter to calculate a memory address corresponding to a particular prediction image among reference images stored in the external memory 42, and retrieves the prediction image from the external memory 42 (S34). Then, the image data decoder 36 decodes the image data of the area $S_n$ (S35). In the inter-mode, the decoded image data is added to the prediction image 40 to thereby generate the final restored image 43 of the area $S_n$. In contrast, if the coding mode is an intra-mode, the decoded image data itself is the final restored image 43 of the area $S_n$. The restored image is written in the external memory 42, so that the image is used as a reference image for generating subsequent prediction images. These judgments and image restoration are executed by the image decoder 41 (S36).

A series of processings complete when all areas included within a particular image frame or a partial image of the frame are treated. The subsequent image frames, or partial images of them, will be processed in the same manner.

Embodiment 5

Figure 19:
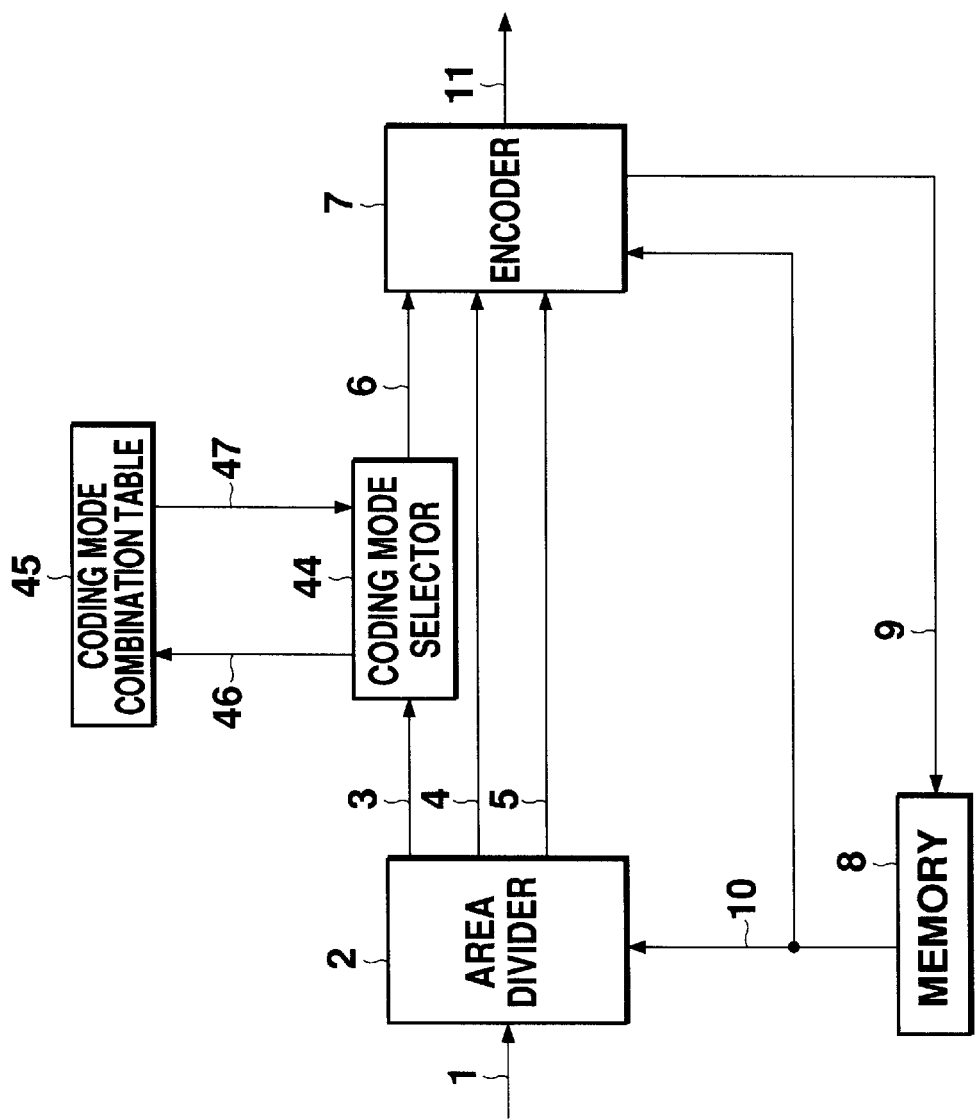
FIG. 19 shows an alternative structure of a moving image coding apparatus according to another embodiment of the present invention.

FIG. 19 is a block diagram showing a structure of a moving image coding apparatus according to the embodiment.

In the figure, a reference numeral 44 is a coding mode selector, 45 is a coding mode combination table, 46 is an area size, and 47 is a selected coding mode combination.

Figure 20:
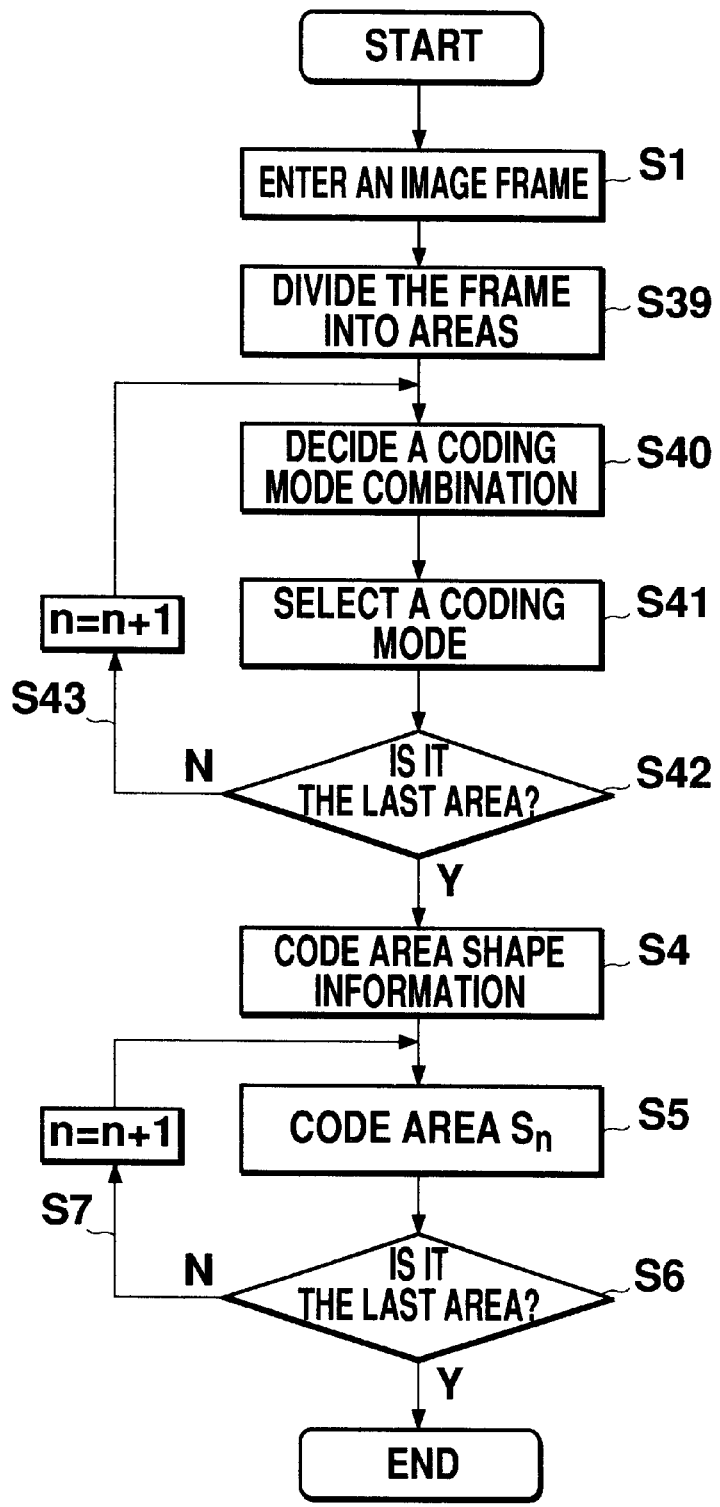
FIG. 20 is a flow chart showing an operation of the coding apparatus shown in FIG. 19.

FIG. 20 is a flow chart showing the operation of the moving image coding apparatus having the structure shown in FIG. 19.

In the embodiment, the apparatus determines in advance combinations of coding modes available for selection for respective area sizes. Possible coding modes are: the inter-mode (i.e., the inter-frame coding mode), the intra-mode (i.e., the in-frame coding mode), a copy mode which directly copies an area image located at a corresponding position of the frame immediately previous to the current frame, and a coding mode in which quantization parameters are changed or unchanged from the preceding frame. For example, possible coding modes for large areas are limited to the inter-mode and the copy mode, as it is less likely to select the intra-mode for such areas.

The coding mode selector 44 selects a particular coding mode combination 47 consisting of possible coding modes from the predetermined coding mode combination table 45, in accordance with the area size 46 obtained by the area divider 2. The selector 44 then determines one coding mode (S41).

This structure allows the possible coding modes to be effectively restricted in accordance with the area size without using any additional information. Thus, it is possible to reduce the amount of codes associated with respective coding modes.

Embodiment 6

A moving image decoding apparatus which decodes the coded bit stream produced by the moving image coding apparatus of the embodiment 5 and generates a restored image will be described.

Figure 21:
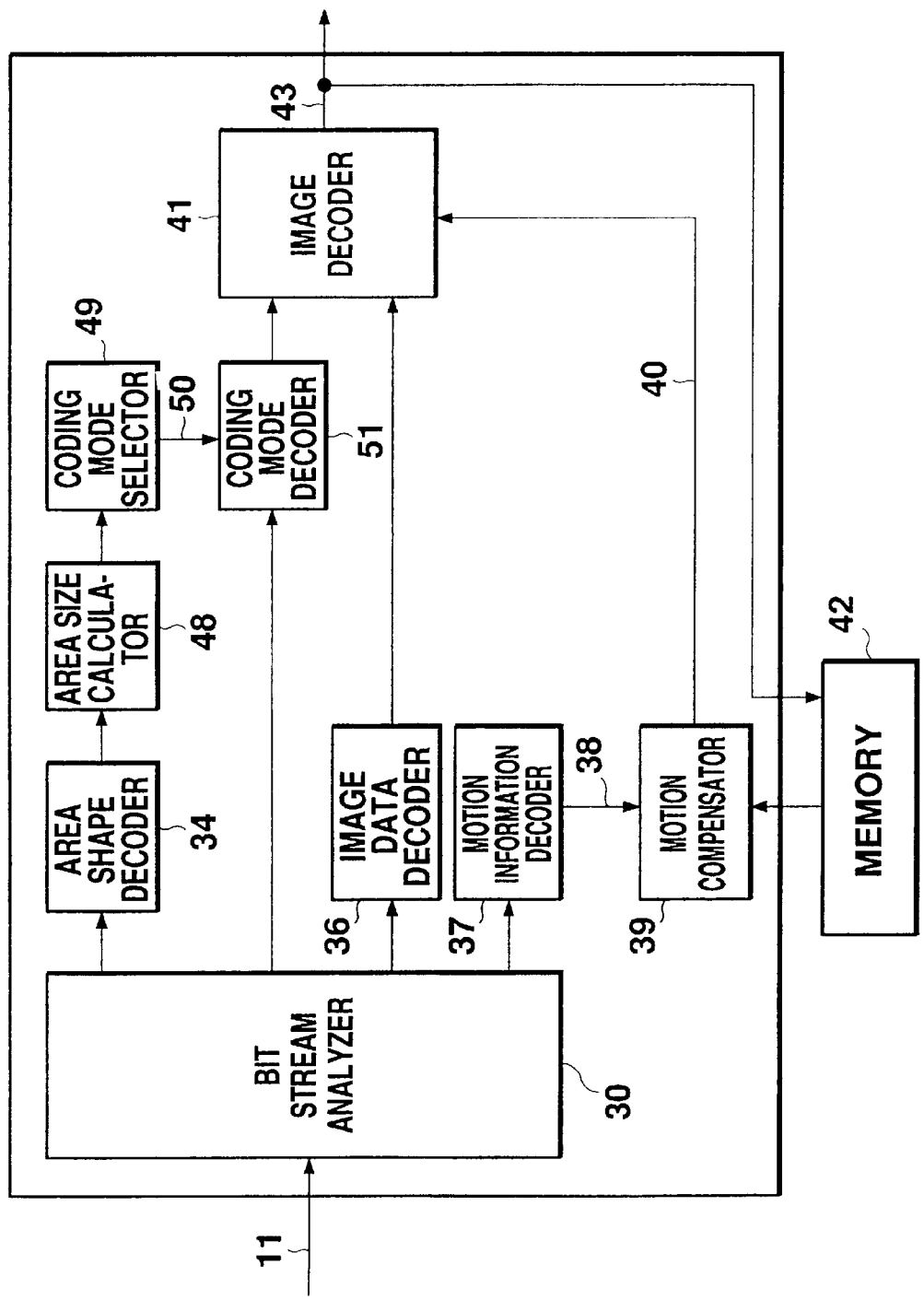
FIG. 21 shows an alternative internal structure of a moving image decoding apparatus according to another embodiment of the present invention.

FIG. 21 shows the structure of the decoding apparatus of the embodiment. In the figure, a reference numeral 48 is an area size calculator, 49 is a coding mode selector, 50 is a combination of possible coding modes, and 51 is a coding mode decoder.

First, the decoding apparatus decodes the area shape information which represents the area division state in the coded bit stream with respect to a particular image frame or a partial image of the frame. The apparatus then specifies a coding mode combination for each area based on the area size, to thereby decode the coding mode. Based on the coding mode, the apparatus decodes the coded bit stream consisting of the image data of each area, which was coded in accordance with the coding mode, and the motion information of each area. Thus, the area image and, consequently, the image frame or the partial image of the frame are restored.

Figure 22:
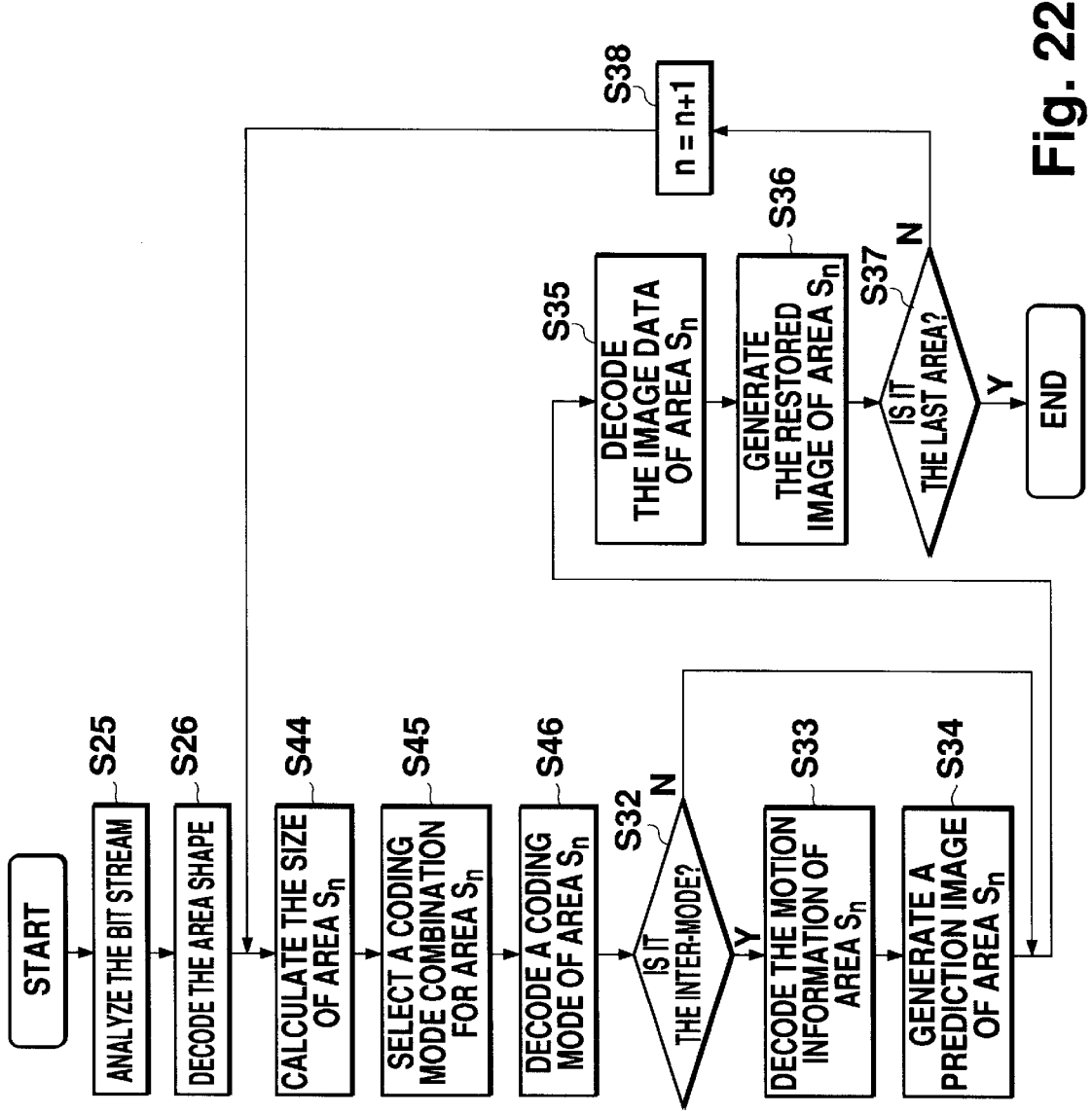
FIG. 22 is a flow chart showing an operation of the decoding apparatus shown in FIG. 21.
Figure 23:
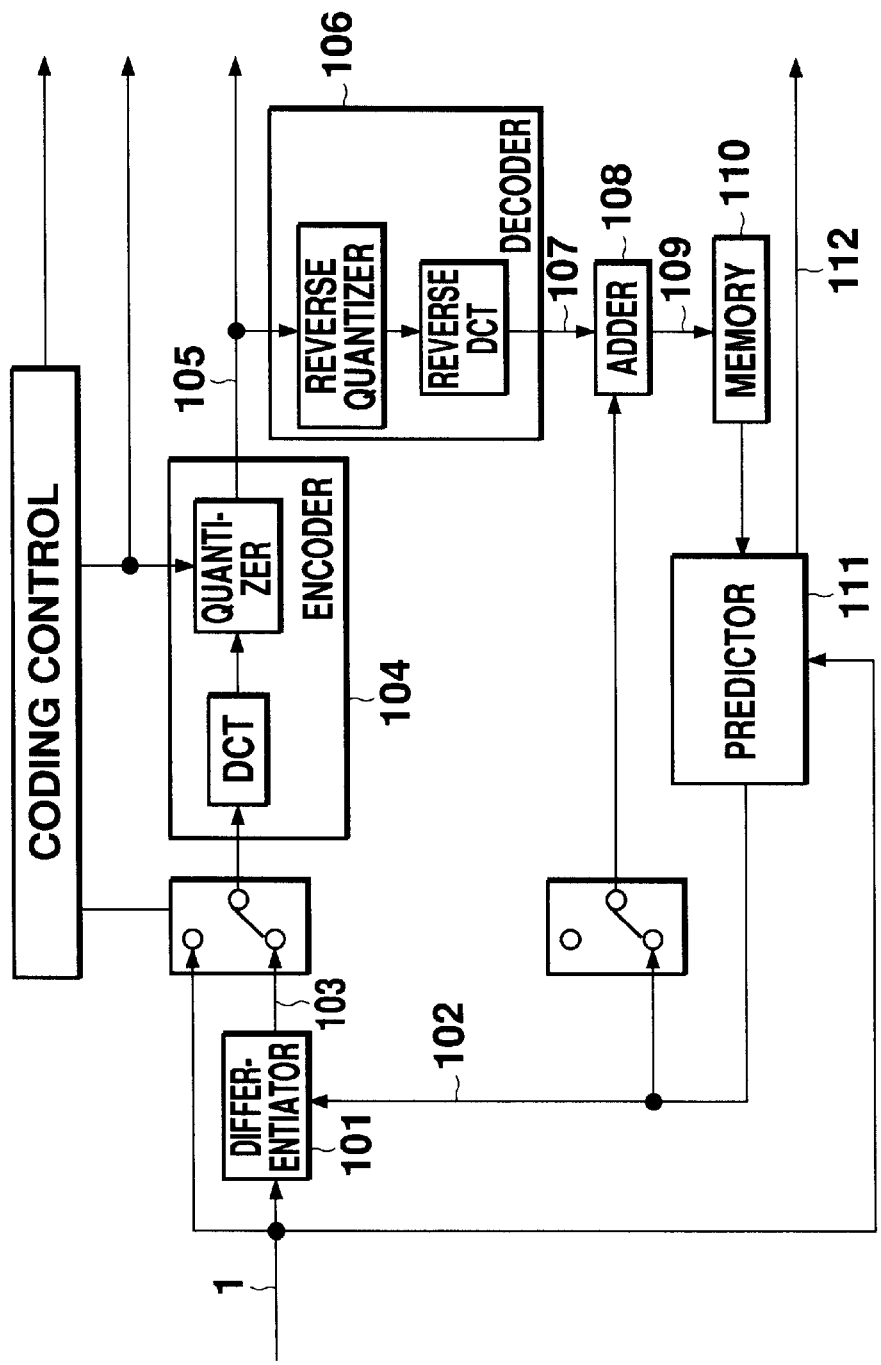
FIG. 23 shows a moving image coding apparatus according to a first conventional technique.
Figure 24:
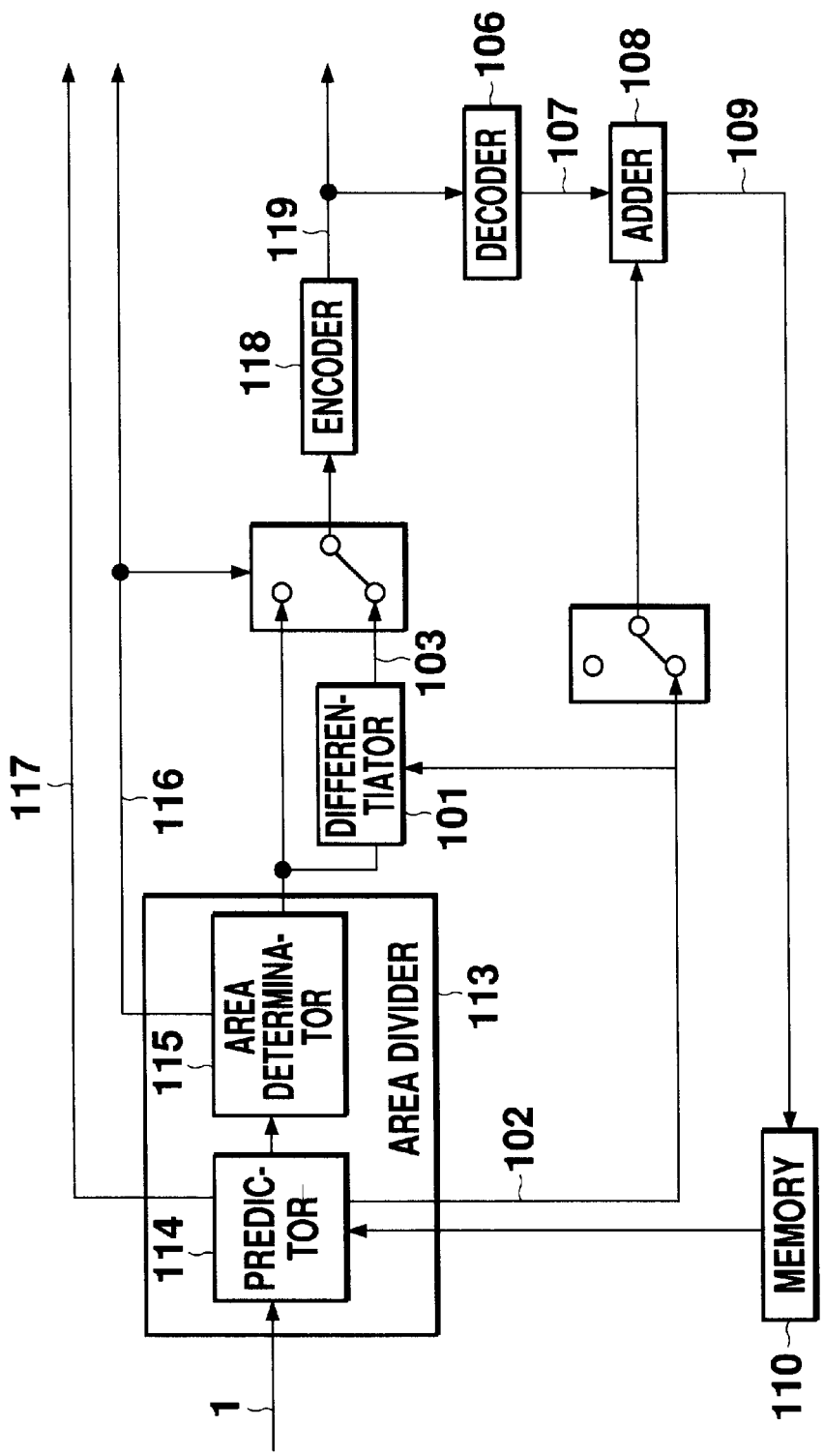
FIG. 24 shows a moving image coding apparatus according to a second conventional technique.

FIG. 22 is a flow chart showing the operation of the decoding apparatus according to the embodiment.

The coded bit stream 11 is initially input to the bit stream analyzer 30 which converts the bit stream into coded data (S25). The area shape decoder 34 decodes the area shape information included in the coded data, whereby the area division state of a particular image frame or a partial image of the frame is restored (S26). As a result, the coding order of the area information coded in the succeeding part of the bit stream is specified. Each area is denoted as $S_n$. In accordance with the coding order, data of each area is decoded in turn from the bit stream. Specifically, the area size calculator 48 calculates the size of each area $S_n$ based on its area shape (S44). The area size is expressed by, e.g., the size of a rectangle circumscribing the area, as show in FIG. 10, or the number of pixels included in the area. Then, the coding mode selector 49 selects the combination of coding modes used for coding the area in accordance with the obtained size of the area $S_n$ (S45). The coding mode decoder 51 decodes the coding mode information of the area $S_n$ from the selected combination (S46). Subsequently, image data of each area will be restored based on the obtained coding mode. The restoration of images is carried out in a similar manner to the embodiment 4.

As described above, the moving image coding apparatus of the present invention includes the area divider and the encoder The area divider further includes the divider and the integrator. As a result, the coding process can be carried out in a flexible manner depending on an image structure by dividing the image into areas and also by integrating the areas. The projector determines the initial area shape by projecting the area shape of the image, which is already divided into areas and coded in the frame immediately previous to the current frame, onto the image to be coded. Thus, the divider subdivides only those areas where the area shape has been changed. In this way, the apparatus allows the amount of calculations associated with the area division, as well as the amount of codes required for the area shape, to be reduced.

When the divider includes a comparator, it compares the activity of each area with a predetermined threshold value to detect areas where the area shape are changed. Subsequently, only such areas are subdivided, while leaving the other areas not subdivided. Thus, the apparatus allows the amount of calculation associated with the area division and the amount of codes required to express the area shape to be reduced.

When the divider determines the activity for each block of a fixed size regardless of the area shape, and divides only the areas located at the blocks having activities greater than the predetermined threshold value, it is possible to detect and divide only part of areas that have changed its shape. For example, a new area can be detected when a new object appears in a large area, such as a background.

The moving image coding apparatus of the present invention also includes the judging element. If the judging element includes the evaluation value calculator, it is possible to select a dividing method applied to the current frame so as to achieve a better coding process, in accordance with the result of the area coding using the area shape of the frame immediately previous to the current frame as the area shape of the image to be coded.

At this time, if a movement between frames is large, so that it is useless to use the area shape of the frame immediately previous to the current frame, the frame can be divided into areas without using such an area shape.

If some change, such as a scene change, is detected based on the evaluation value, the apparatus can switch the dividing and coding method to the method using only the in-frame information.

In the meanwhile, the moving image decoding apparatus of the present invention includes the area dividing method decoder, the area shape decoder, and the image data decoder. Thus, the decoding apparatus can deal with various area shapes generated by the moving image coding apparatus by means of different area dividing methods depending on the contents of the image. This helps the decoding apparatus to be combined with the coding apparatus.

Another moving image coding apparatus of the present invention includes the area divider, the coding mode selector, and the encoder. The apparatus allows the amount of codes required for a particular coding mode to be reduced by limiting the combinations of possible coding modes in accordance with the area size determined by the area divider.

Another moving image decoding apparatus of the present invention includes the area shape decoder, the coding mode selector, and the coding mode decoder. Thus, the apparatus can deal with even the limited combinations of possible coding modes determined by the coding apparatus depending on the area size. This helps the decoding apparatus to be combined with the coding apparatus.

In the meanwhile, the moving image coding method of the present invention includes the area dividing step and the coding step. The area dividing step further includes the dividing and the integrating steps. As a result, the coding process can be carried out in a flexible manner depending on the image structure. The projecting step determines the initial area shape by projecting the area shape of the image, which is already divided into areas and coded in the frame immediately previous to the current frame, onto the image to be coded. Thus, the dividing step subdivides only those areas where the area shape is changed. In this way, the method allows the amount of calculations associated with the area division, as well as the amount of codes required for the area shape, to be reduced.

When the dividing step includes a comparing step, the activity of each area is compared with a predetermined threshold value so as to detect areas where the area shape is changed. Subsequently, only such areas are subdivided, while leaving the other areas not subdivided. Thus, the method allows the amount of calculations associated with the area division and the amount of codes required for the area shape to be reduced.

When the dividing step determines the activity for each block of a fixed size regardless of the area shape, and divides only the areas located at blocks having activities greater than the predetermined threshold value, it is possible to detect and divide only part of areas that changed its shape. For example, a new area can be detected when a new object appears in a large area, such as a background.

The moving image coding method of the present invention also includes the judging step. If the judging step includes the evaluation value calculating step, it is possible to select a frame dividing method applied to the current frame so as to achieve a better coding process, in accordance with the result of the area coding using the area shape of the frame immediately previous to the current frame as the area shape of the image to be coded.

At this time, if a movement between frames is large, so that it is useless to use the area shape of the frame immediately previous to the current frame, the frame can be divided into areas without using such an area shape.

If some change, such as a scene change, is detected based on the evaluation value, the dividing and coding method can be switched to the method using only the in-frame information.

In the meanwhile, the moving image decoding method of the present invention includes the area dividing method decoding step, the area shape decoding step, and the image data decoding step. Thus, the decoding method can deal with various area shapes generated by the moving image coding method by means of different area dividing methods depending on the contents of the image. This helps the decoding method to be combined with the coding method.

Another moving image coding method of the present invention includes the area dividing step, the coding mode selecting step, and the coding step. The method allows the amount of codes required for a particular coding mode to be reduced by limiting the combinations of possible coding modes in accordance with the area size determined by the area dividing step.

Another moving image decoding method of the present invention includes the area shape decoding step, the coding mode selecting step, and the coding mode decoding step. Thus, the method can deal with even the limited combinations of possible coding modes determined by the coding method depending on the area size. This helps the decoding method to be combined with the coding method.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A moving image coding apparatus which divides an input digital image into a plurality of areas with a predetermined method comprising:

a memory which stores information representing the shape of the areas;

a projector which reads from said memory the area shape of a previously coded image, and projects the area shape onto an image to be coded to obtain an initial area shape;

a divider which further divides each area of the input image into smaller areas in accordance with a predetermined judging method, the initial area shape of the input image being determined by said projector;

an integrator which integrates the areas divided by said divider while determining whether or not each area is integrated with an adjacent area in accordance with the predetermined judging method; and an encoder which codes information from each area, the information including the image signals, motion information, shape information, and other attribute information.

2. A moving image decoding apparatus which receives and decodes coded data of an image which is divided into a plurality of areas, the coded data including division information regarding whether the image is divided using the area shape of a previous image which is already divided into areas and coded, the apparatus comprising:

an area shape decoder which decodes information regarding the area shape based on said division information, and restores the shape of each area divided during coding; and an image data decoder which restores the image of each area from the coded data.

3. A moving image coding apparatus which divides an input digital image into a plurality of areas, the apparatus comprising:

a coding mode selector which selects a combination of coding modes from a predetermined number of coding modes, based on the size of the area obtained by an area divider, and an encoder which codes data supplied from said area divider and outputs coded data, the image signals, and motion and attribute information from each area, based on a coding mode selected from said combination of coding modes.

4. The moving image coding apparatus according to claim 3, wherein said coding apparatus divides the input digital image into a plurality of areas with a predetermined method.

5. A moving image decoding apparatus which receives and decodes coded data of an image which is divided into a plurality of areas, the apparatus comprising:

an image data decoder which restores the shape of each divided area, determines a combination of possible coding modes based on the restored shape of each area, specifies a coding mode from said combination of coding modes for each area based on code words corresponding to the specified coding mode included in the coded data, and restores the image of each area in accordance with the specified coding mode.

6. A moving image coding method which divides an input digital image into a plurality of areas with a predetermined method comprising the steps of:

storing information representing the shape of the areas; and reading the stored area shape of a previously coded image, and projecting the area shape onto an image to be coded to obtain an initial area shape, dividing each area of the input image into smaller areas in accordance with a predetermined judging method, the initial area shape of the input image being determined by said projecting step, integrating the areas divided by said dividing step while determining whether or not each area is integrated with an adjacent area in accordance with the predetermined judging method, and coding information from each area, the information including the image signals, motion information, shape information, and other attribute information.

7. A moving image decoding method which receives and decodes coded data of an image which is divided into a plurality of areas, the coded data including division information regarding whether the image is divided using the area shape of a previous image which is already divided into areas and coded, the method comprising the steps of:

decoding information regarding the area shape based on the division information, and restoring the shape of each area divided during coding; and restoring the image of each area from the coded data.

8. A moving image coding method which divides an input digital image into a plurality of areas, the method comprising the steps of:

selecting a combination of coding modes from a predetermined number of coding modes, based on the size of the area; and coding image signals and attribute information from each area, based on a coding mode selected from said combination of coding modes.

9. The moving image coding method according to claim 8, wherein the method divides an input digital image into a plurality of areas with a predetermined method.

10. A moving image decoding method which receives and decodes coded data of an image which is divided into a plurality of areas, the method comprising the steps of:

restoring the shape of each area divided; and determining a combination of possible coding modes based on the restored shape of each area, specifying a coding mode from said combination of coding modes for each area based on code words corresponding to the specified coding mode included in the coded data, and restoring the image of each area in accordance with the specified coding mode.

11. A moving image coding apparatus which divides an input digital image into a plurality of areas, the apparatus comprising:

a memory which stores information representing the shape of the areas;

a projector which reads from said memory the area shape of a previously coded image, and projects the area shape onto an image to be coded to obtain an initial area shape;

a divider which further divides each area of the input image into smaller areas, the initial area shape of the input image being determined by said projector;

an integrator which integrates the areas divided by said divider while determining whether or not each area is integrated with an adjacent area; and an encoder which codes information from each area, the information including the image signals, motion information, shape information, and other attribute information.

12. The moving image coding apparatus according to claim 11, wherein said divider includes, an activity calculator which calculates an activity for each area determined by said projector, a comparator which compares the activity with a first value, and a subdivider which divides a particular area having the activity greater than the first value into smaller areas in accordance with the comparison result obtained by said comparator.

13. The moving image coding apparatus according to claim 12, wherein said activity is expressed as a cost of the amount of coding rate and distortion.

14. The moving image coding apparatus according to claim 12, wherein said activity is expressed as a prediction error power associated with the motion compensative prediction of areas.

15. The moving image coding apparatus according to claim 12, wherein said activity is expressed as a variance value within the area.

16. The moving image coding apparatus according to claim 12, wherein said activity is expressed as an edge strength within the area.

17. The moving image coding apparatus according to claim 12, wherein said activity is expressed as a linear sum of a cost of the amount of coding rate and distortion, a prediction error power associated with the motion compensative prediction of areas, a variance value within the area, and an edge strength within the area.

18. The moving image coding apparatus according to claim 11, wherein said divider includes, an activity calculator which calculates an activity for each block of a fixed size regardless of the shape information, a comparator which compares the activity with a first value, and a subdivider which divides an area overlapped with said block of a fixed size having an activity greater than the first value into smaller areas in accordance with the comparison result obtained by said comparator.

19. The moving image coding apparatus according to claim 11, wherein said area divider further includes, an evaluation value calculating section which calculates an evaluation value of a result of the area division, and a judging section which judges an evaluation value of the area division of an image to be coded based on the area shape of the previous image which is already divided into areas and coded, and determines whether the area shape of the previous image is used.

20. The moving image coding apparatus according to claim 19, wherein said judging section carries out the area division without using the area shape of the previous image which is already divided into areas and coded, when the evaluation value of the area division of the image to be coded based on the area shape of the previous image exceeds a first value.

21. The moving image coding apparatus according to claim 19, wherein said judging section carries out the area division within the image to be coded, when the evaluation value of the area division of the image to be coded based on the area shape of the previous image which is already divided into areas and coded exceeds a first value.

22. The moving image coding apparatus according to claim 19, wherein said judging section carries out the area division without using the area shape of the previous image which is already divided into areas and coded, when the evaluation value of the area division of the image to be coded based on the area shape of the previous image exceeds a first value;

said judging section carries out the area division within the image to be coded, when the evaluation value of the area division of the image to be coded based on the area shape of the previous image which is already divided into areas and coded exceeds a second value; and wherein the first value is greater than the second value.

23. A moving image coding method which divides an input digital image into a plurality of areas, the method comprising the steps of:

storing information representing the shape of the areas;

reading the stored area shape of a previously coded image, and projecting the area shape onto an image to be coded to obtain an initial area shape;

dividing each area of the input image into smaller areas, the initial area shape of the input image being determined by said projecting step;

integrating the areas divided by said dividing step while determining whether or not each area is integrated with an adjacent area; and coding information from each area, the information including the image signals, motion information, shape information, and other attribute information.

24. The moving image coding method according to claim 23, wherein said dividing step includes the steps of, calculating an activity for each area determined by said projecting step;

comparing the activity with a first value; and subdividing a particular area having the activity greater than the first value into smaller areas in accordance with the comparison result obtained by said comparing step.

25. The moving image coding method according to claim 24, wherein said activity is expressed as a cost of the amount of coding rate and distortion.

26. The moving image coding method according to claim 24, wherein said activity is expressed as a prediction error power associated with the motion compensative prediction of areas.

27. The moving image coding method according to claim 24, wherein said activity is expressed as a variance value within the area.

28. The moving image coding method according to claim 24, wherein said activity is expressed as an edge strength within the area.

29. The moving image coding method according to claim 24, wherein said activity is expressed as a linear sum of a cost of the amount of coding rate and distortion, a prediction error power associated with the motion compensative prediction of areas, a variance value within the area, and an edge strength within the area.

30. The moving image coding method according to claim 23, wherein said dividing step includes the steps of, calculating an activity for each block of a fixed size regardless of the shape information;

comparing the activity with a first value; and subdividing an area overlapped with said block of a fixed size having an activity greater than the first value into smaller areas in accordance with the comparison result obtained by the comparing step.

31. The moving image coding method according to claim 23, wherein said area dividing step further includes, calculating an evaluation value of a result of the area division, and judging an evaluation value of the area division of an image to be coded based on the area shape of the previous image which is already divided into areas and coded, and determining whether the area shape of the previous image is used.

32. The moving image coding method according to claim 31, wherein said judging step carries out the area division without using the area shape of the previous image which is already divided into areas and coded, when the evaluation value of the area division of the image to be coded based on the area shape of the previous image exceeds a first value.

33. The moving image coding method according to claim 31, wherein said judging step carries out the area division within the image to be coded, when the evaluation value of the area division of the image to be coded based on the area shape of the previous image which is already divided into areas and coded exceeds a first value.

34. The moving image coding method according to claim 31, wherein said judging step carries out the area division without using the area shape of the previous image which is already divided into areas and coded, when the evaluation value of the area division of the image to be coded based on the area shape of the previous image exceeds a first value;

said judging step carries out the area division within the image to be coded, when the evaluation value of the area division of the image to be coded based on the area shape of the previous image which is already divided into areas and coded exceeds a second value; and wherein the first value is greater than the second value.

35. A moving image decoding apparatus which receives image data having been encoded, after the image was divided into a plurality of areas, for every divided area, and decodes encoded data received, the encoded data containing an area shape encoded mode which indicates whether to use area shape information of a previous frame or solely information in a frame for restoring an area shape of each divided area, the apparatus, comprising:

an area shape encoded mode decoder for decoding the encoded data to restore an area shape encoded mode for every divided area contained in the encoded data; and an area shape decoder for decoding the encoded data according to the area shape encoded mode restored in the area shape encoded mode decoder, to restore an area shape.

36. A moving image decoding method for receiving image data having been encoded, after the image was divided into a plurality of areas, for every divided area, and decoding encoded data received, the encoded data containing an area shape encoded mode which indicates whether to use area shape information of a previous frame or solely information in a frame for restoring an area shape of each divided area, the method, comprising the steps of:

decoding the encoded data to restore an area shape encoded mode for every divided area contained in the encoded data; and decoding the encoded data according to the area shape encoded mode restored in a previous step, to restore an area shape.

* * * * *